INVENTOR.
RICHARD S. SHARP
BY
Christie, Parker & Hale
ATTORNEYS.

Dec. 5, 1967 R. S. SHARP 3,356,993

MEMORY SYSTEM

Filed July 31, 1964 15 Sheets-Sheet 3

Dec. 5, 1967 R. S. SHARP 3,356,993

MEMORY SYSTEM

Filed July 31, 1964 15 Sheets-Sheet 6

Dec. 5, 1967 R. S. SHARP 3,356,993

MEMORY SYSTEM

Filed July 31, 1964 15 Sheets-Sheet 8

Dec. 5, 1967 R. S. SHARP 3,356,993

MEMORY SYSTEM

Filed July 31, 1964 15 Sheets-Sheet 14

Dec. 5, 1967 R. S. SHARP 3,356,993

MEMORY SYSTEM

Filed July 31, 1964 15 Sheets-Sheet 13

United States Patent Office 3,356,993

Patented Dec. 5, 1967

3,356,993

MEMORY SYSTEM

Richard S. Sharp, Sierra Madre, Calif., assignor to Burroughs Corporation, Detroit, Mich., a corporation of Michigan Filed July 31, 1964, Ser. No. 386,552
33 Claims. (Cl. 340—172.5)

ABSTRACT OF THE DISCLOSURE

A memory coupled to an information register which temporarily stores information being read and rewritten in the memory including a gate for shifting information as it is transferred between the memory and the information register causing information which has been read out into the register and rewritten in the memory to be shifted in the cells of the memory location from which the information was originally read.

This invention relates broadly to memory devices and more particularly to an improved memory system for shifting the storage content thereof.

Magnetic core memory systems are generally known which comprise a memory, having a number of different addressable memory locations, and a temporary information register, for storing information being transferred between the memory device and, for example, a peripheral device. Such magnetic core memory systems generally store information parallel by bit. That is, a plurality of bits of information, comprising one word, are stored into the magnetic core memory in parallel.

Many times it is desired to provide words of information to the memory device for storage serial by bit. In order to store a serial word into the memory, it is necessary to collect the serial bits so that they may be stored into the memory device in parallel. Thus, it is necessary to do a serial to parallel translation of the serial bits of the word. One way to accomplish this is to use a gate for storing bits of the serial word into the cells of the information register and a counter to select the cells into which the bits are to be stored. The bits are stored, one by one, in different cells until the bits of a complete word are stored in the register and then the bits of the word are stored in parallel into the memory. Another way to accomplish the serial to parallel translation is to shift the serial bits of each word into the information register, bit by bit, until a complete word is accumulated therein and then store the word into the memory.

The aforementioned arrangements suffer from the serious disadvantage that either gating and timing circuitry is necessary to select the cells of the information register into which the bits of the word are to be stored and for storing the bits of the word, or gating is necessary to shift the bits of the word through the cells of the information register until all bits of the word are stored. This gating and timing circuitry substantially increases the cost of the system. Also time is wasted in shifting the bits in the information register.

Applications arise wherein a plurality of asynchronously operating peripheral devices all send words in a manner characterized as serial by bit. The presence of the serial bits of a word from one peripheral device may overlap in time with a word from one of the other peripheral devices. Again, if the words are to be stored parallel by bit in a magnetic core memory, it is necessary to translate the bits into a word, parallel by bit. This is quite difficult to accomplish in accordance with the prior art memory systems unless buffers are provided for each peripheral unit for making a serial to parallel bit translation before the bits are stored in the information register. The addition of a buffer for each peripheral unit for making the serial to parallel bit translation is undesirable as it substantially increases the cost of a system.

In one embodiment of the present invention, a memory system is arranged whereby serial bits of an incoming word are stored in the information register and as bits are transferred between the information register and the memory they are automatically shifted in a novel manner, allowing the serial bits to be stored in one cell of the information register directly without additional buffering.

It is also desirable to read the bits of a word out of a magnetic core memory in parallel and provide them to a peripheral device serially. The parallel to serial conversion may be accomplished by reading a word from the memory and storing the word in an information register and then shifting the bits of the word out of one end of the information register. However, gating is required to make the shift. Also, if words in a number of different memory locations are to be sent to a number of different peripheral devices, then separate buffers are generally needed for each peripheral device for making the parallel to serial translation. Thus cost of a system is increased in one arrangement by adding gating circuitry for causing a shift in the information register and in the other by the addition of a buffer for each peripheral device.

In contrast, one embodiment of the present invention is arranged whereby the bits of a word stored in a storage location of the memory are read out and stored in the information register once for each bit of the word. As the bits are transferred between the memory and information register they are shifted in a novel manner causing the bits to be placed one by one in one cell of the register and thereby serialize a word right in the information register without the need of additional buffering or gating for shifting the word.

Consider now another aspect of the present invention. In a magnetic core memory the amount of address selection circuitry required for the memory may be reduced by increasing the amount of information stored into a single addressable memory location. For example, two words, rather than one, may be stored in each addressable location of a memory. In an embodiment of the present invention, two words are stored in each memory location of a magnetic core memory and as the words are read out of the memory, stored in the information register and rewritten into the memory location the positions of the words in the memory locations are interchanged so that the next time the words are stored in the information register their positions will be reversed. In this manner circuitry need not be provided for transferring words from both sections of the information register but only from one section.

In still another embodiment of the present invention, an information register having two sections for storing two words is used in conjunction with a magnetic core memory which stores two words in each memory location. Two words from a peripheral device in one memory location, are stored in the information register, one word at a time. The words are transferred between the memory and the information register in a novel manner which causes both words to be sequentially stored in one section of the information register, reducing the amount of input gating required over that required if words from the peripheral device were to be stored in both sections of the information register.

Briefly, a storage system embodying the present invention comprises a memory means having input and output circuits and having a plurality of addressable memory locations, each comprising a plurality of memory cells for storing a plurality of signal bits. Temporary information storage means is provided having input and output circuits. First means is coupled between the output circuit of the memory means and the input circuit of the information storage means and second means is coupled between the input circuit of the memory means and the output circuit of the information storage means, the first and second coupling means being adapted for causing the signal bits read out of the memory means and stored in the information storage means to be written into the memory means shifted in the memory cells from which the signals are read. Means is also provided for addressing the memory location and for causing the content of the memory cells thereof to be read out, stored in the information storage means and rewritten into an addressable memory location, thereby causing a shift in the position of the signal bits in the cells of an addressed memory location.

These and other aspects of the present invention may be more fully understood with reference to the following description of the drawings of which:

FIGS. 1A and 1B form a block diagram, partially in chematic diagram form, of an inquiry system having a memory and embodying the present invention;

FIG. 1 is a sketch illustrating the manner in which FIGS. 1A and 1B are joined together;

Figures 1, 1A:
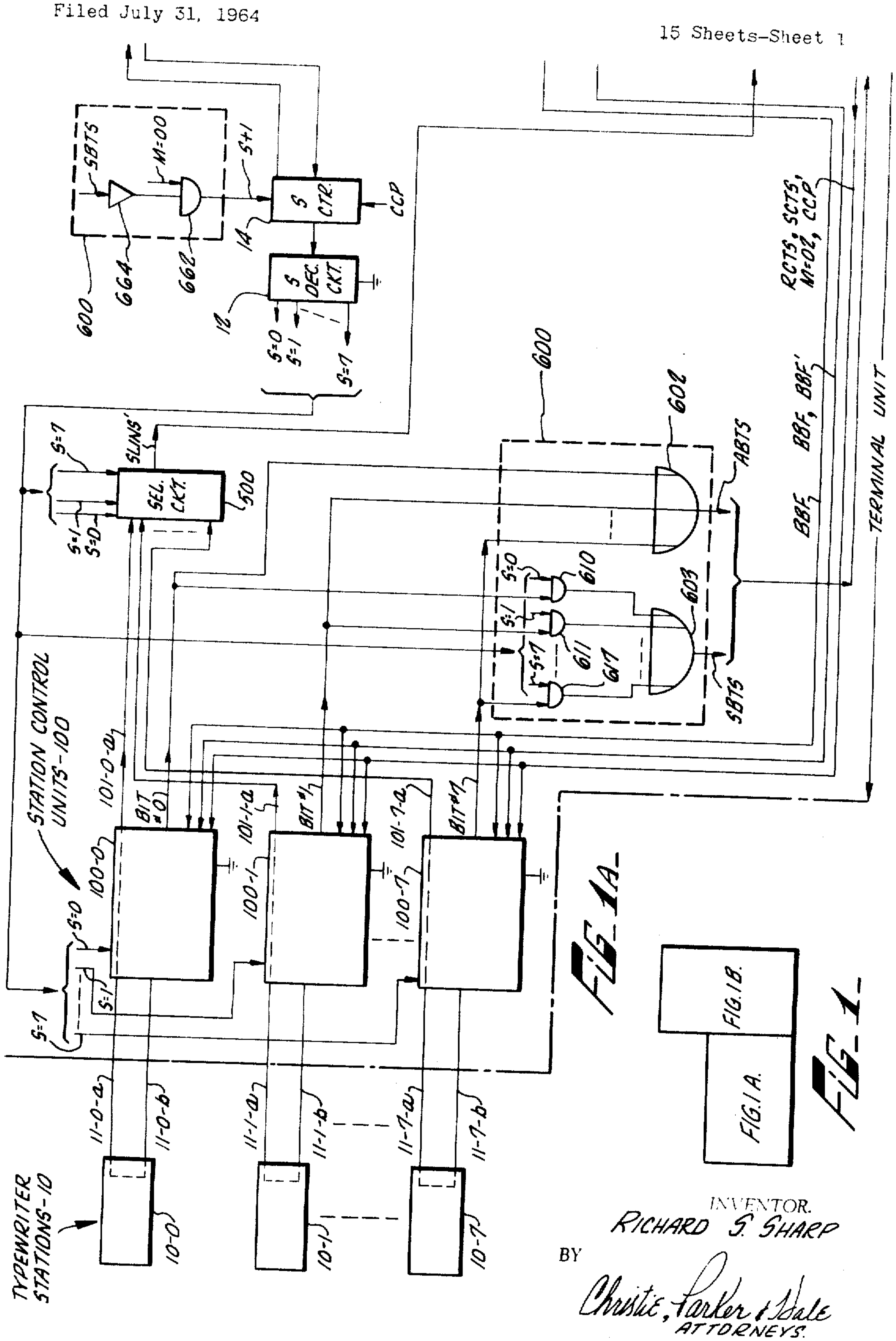
Figure 18:
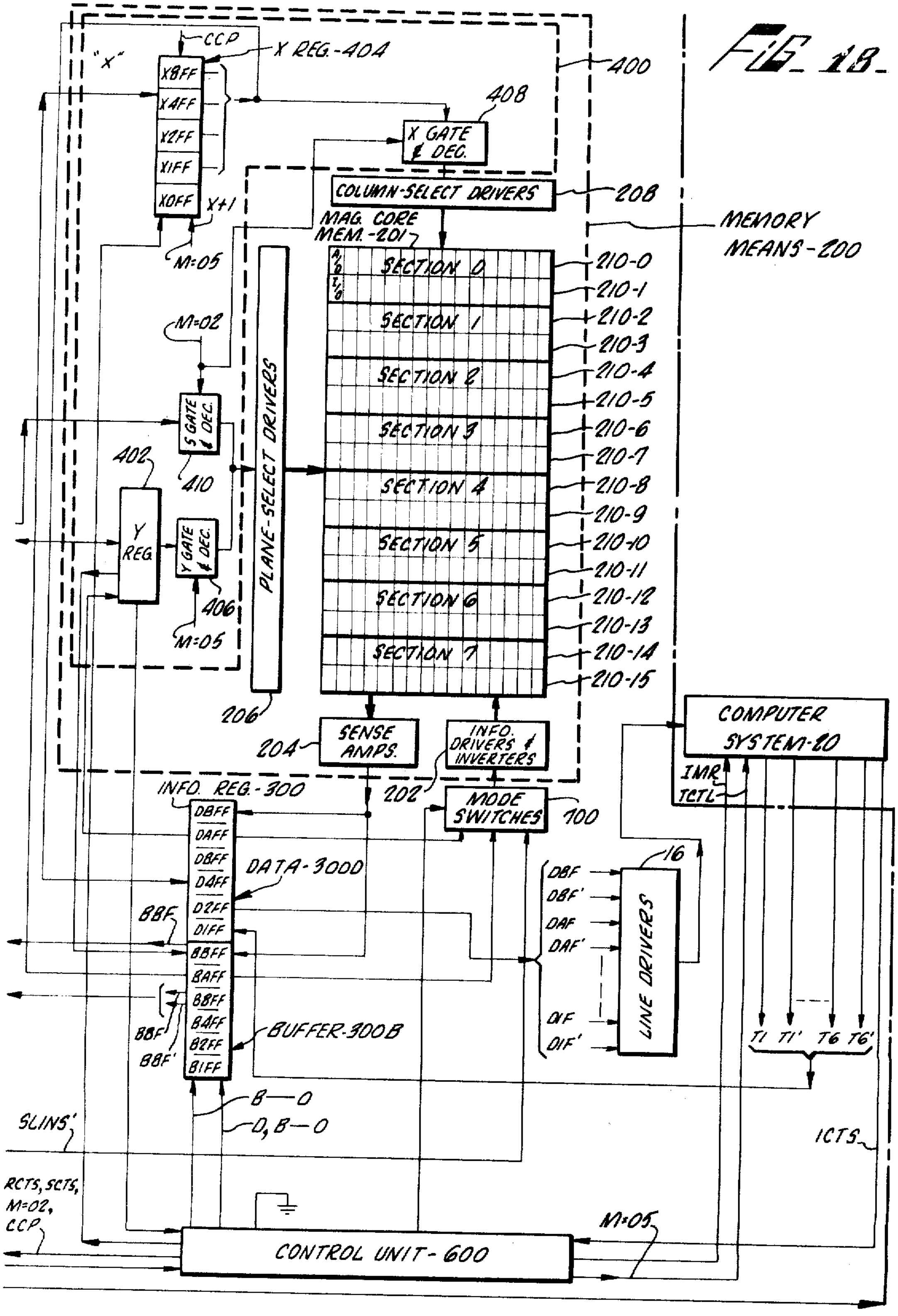
Figure 2:
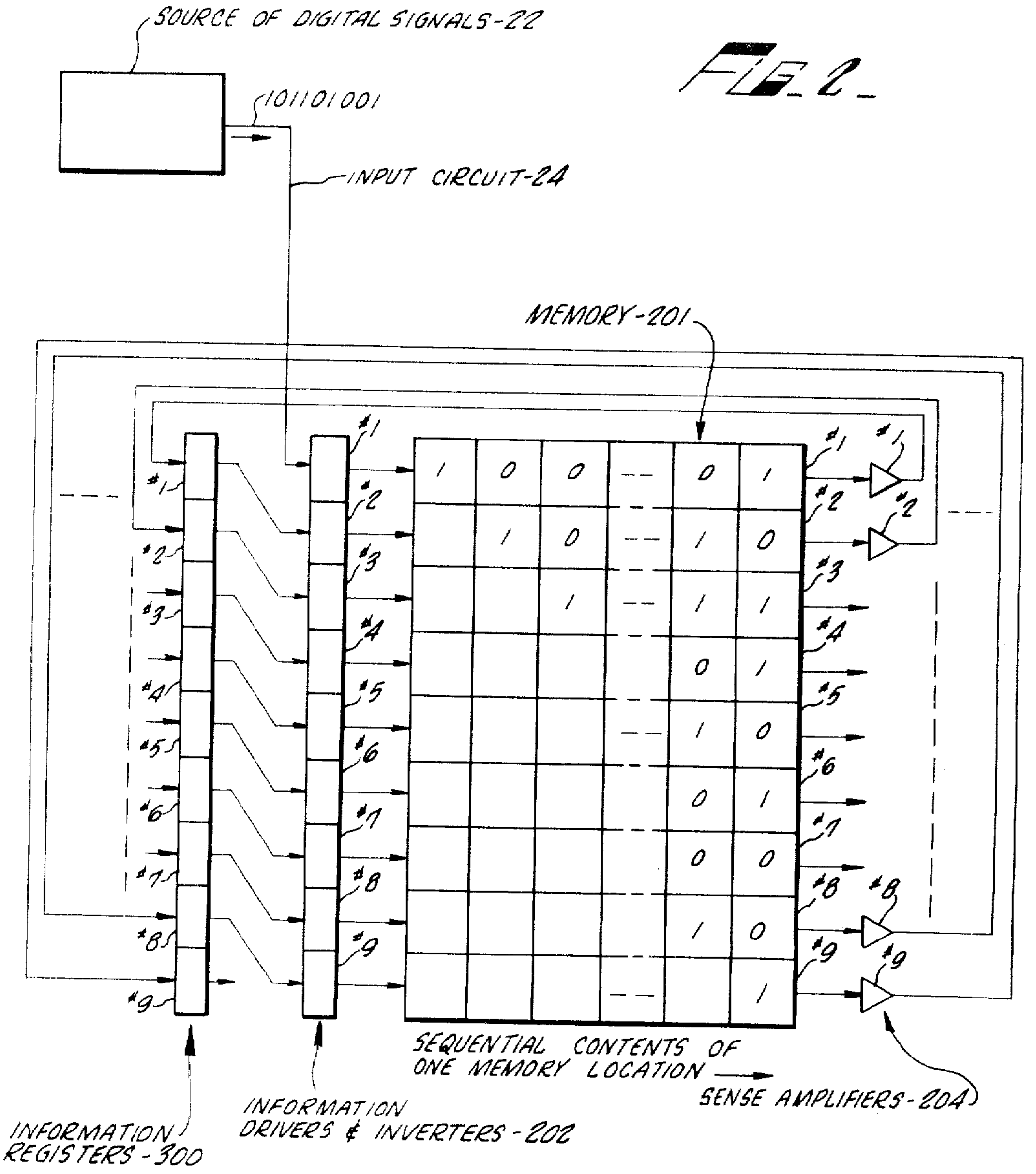
FIG. 2 is a general block diagram, partially in pictorial diagram form of a memory system and embodying one form of the present invention.
Figure 10A:
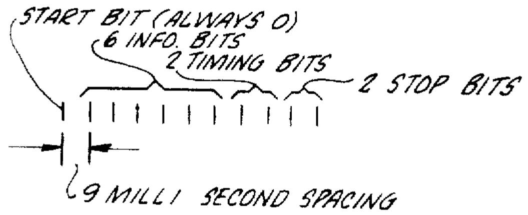
Figure 3:
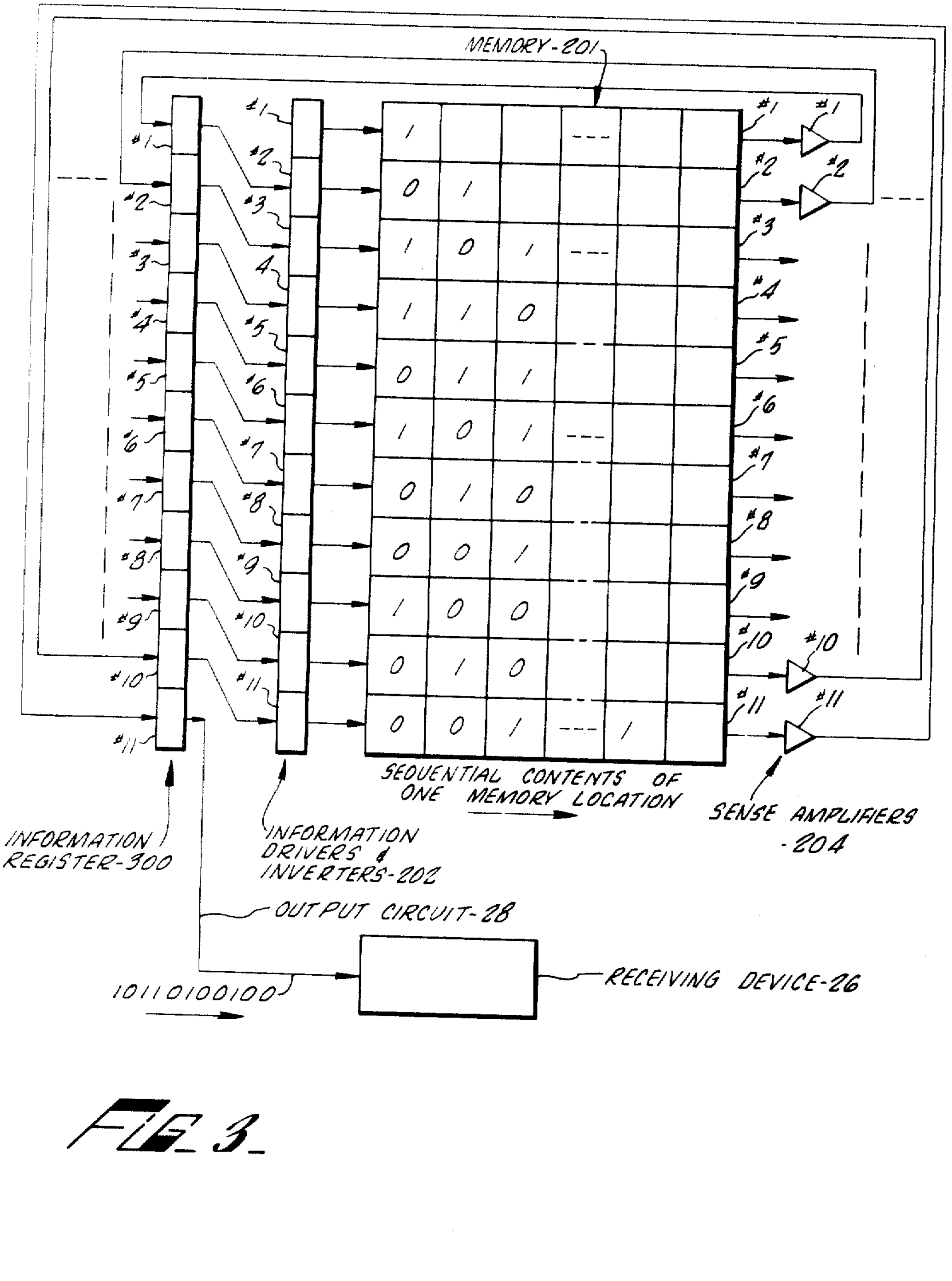
FIG. 3 is a general block diagram, partially in pictorial diagram form, of a memory system and embodying another form of the present invention.
Figure 4:
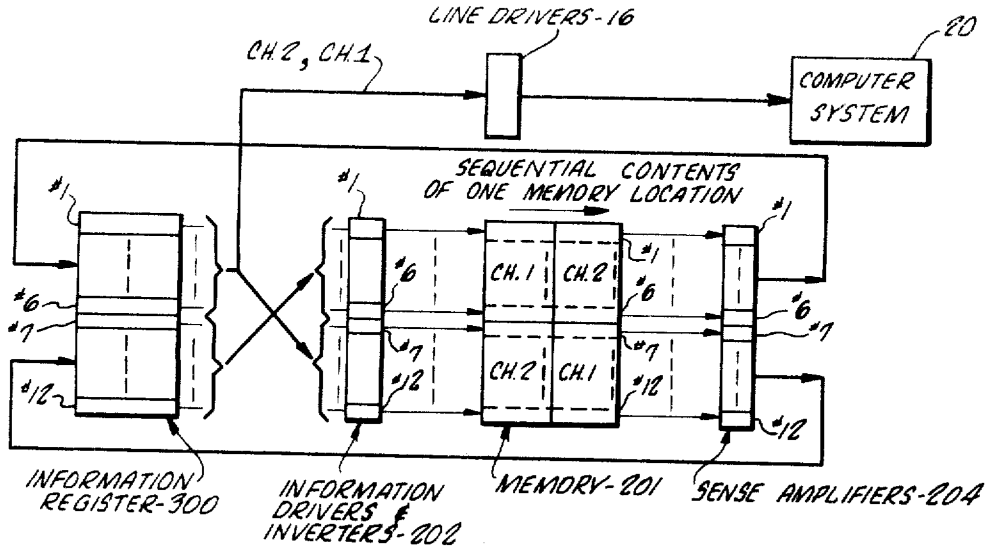
FIG. 4 is a general block diagram, partially in pictorial diagram form, of a memory system and embodying still another form of the present invention.
Figure 5:
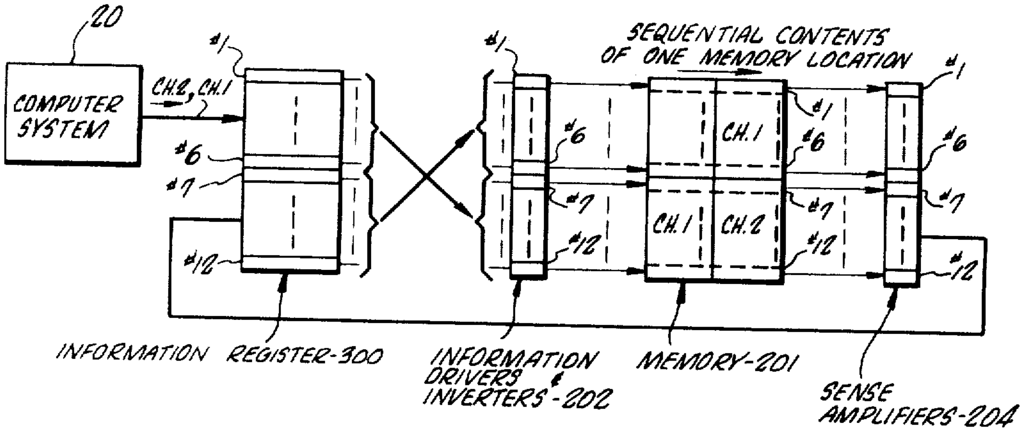
FIG. 5 is a general block diagram, partly in pictorial diagram form, of a memory system embodying yet another form of the present invention.
Figure 9B:
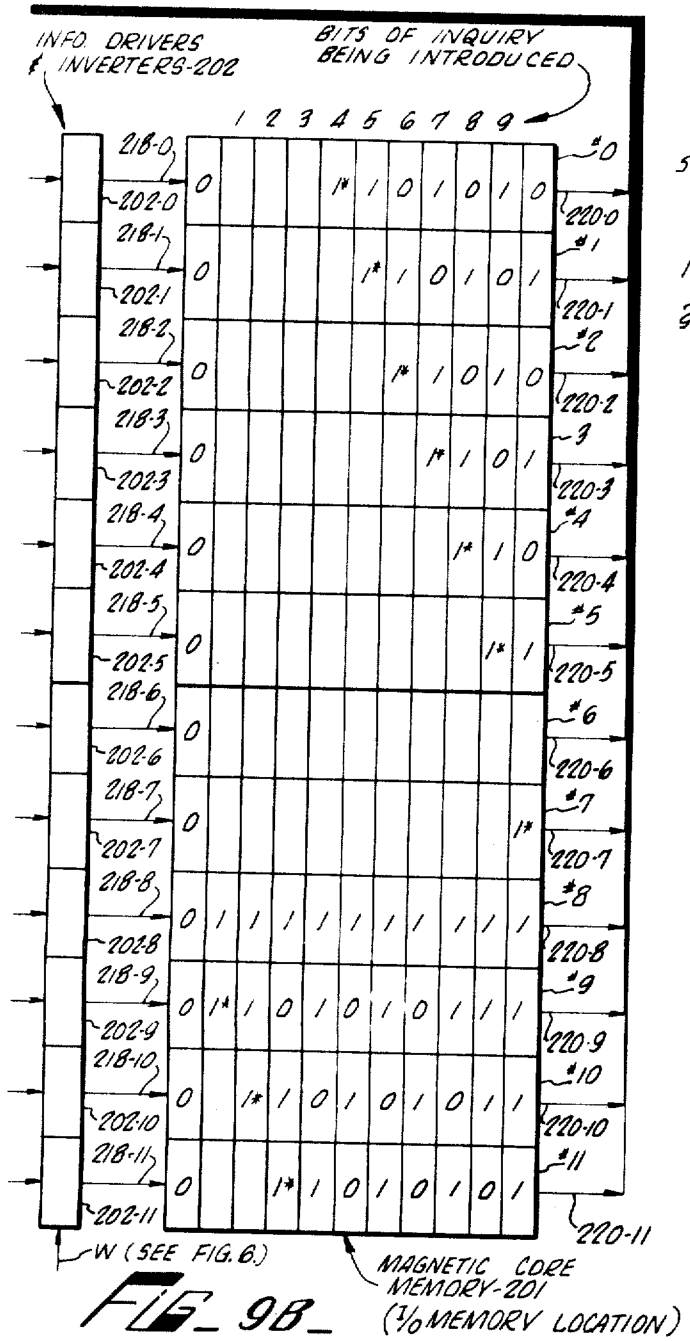
Figure 9C:
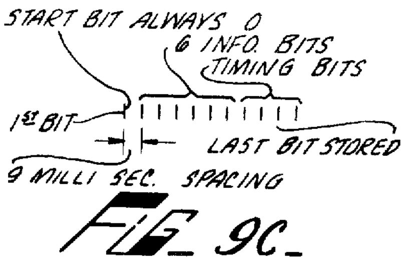
Figure 9:
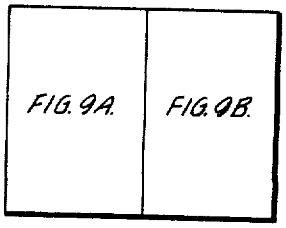
Figure 9A:
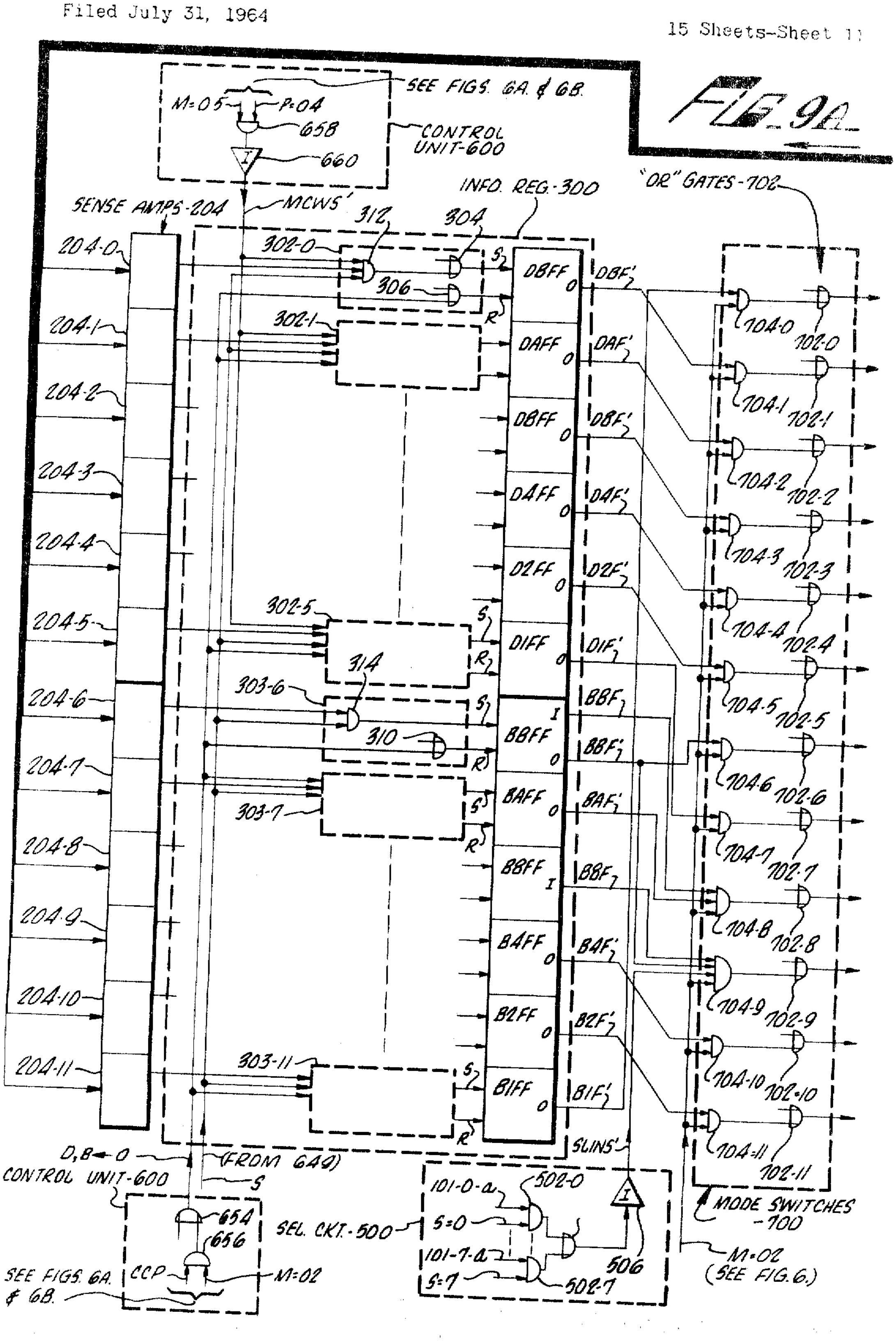
Figure 10:
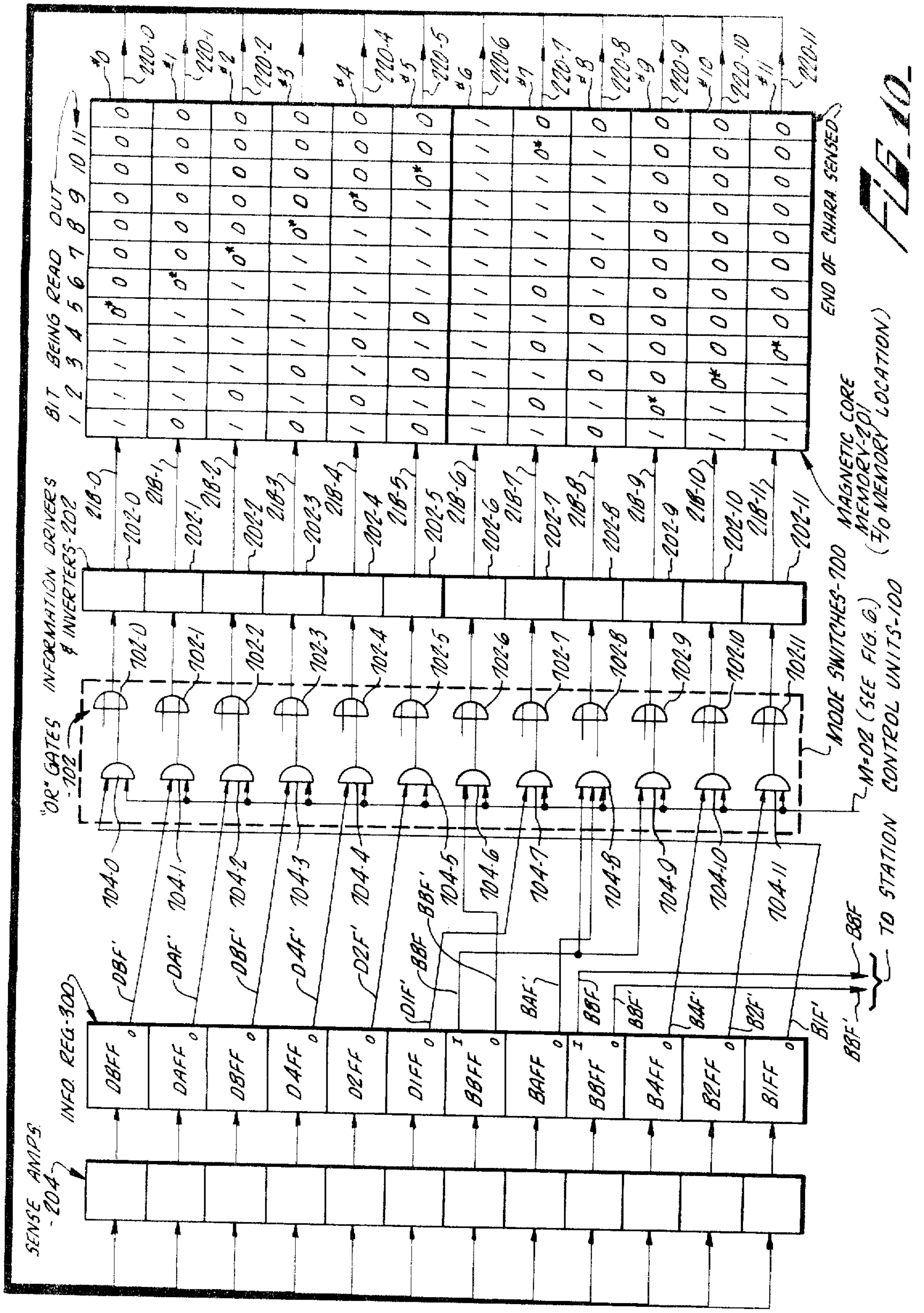
Figure 11:
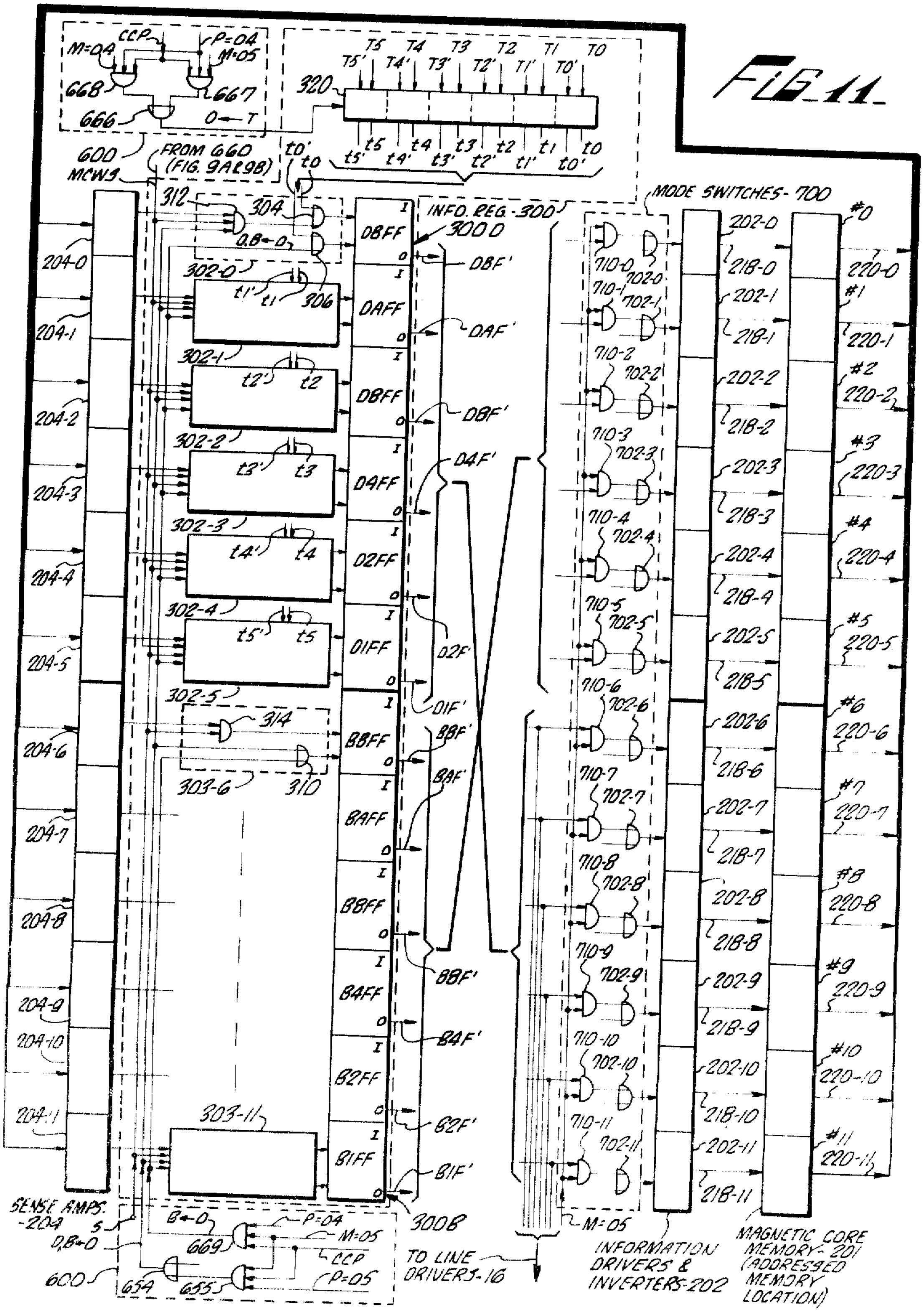
Figure 12:
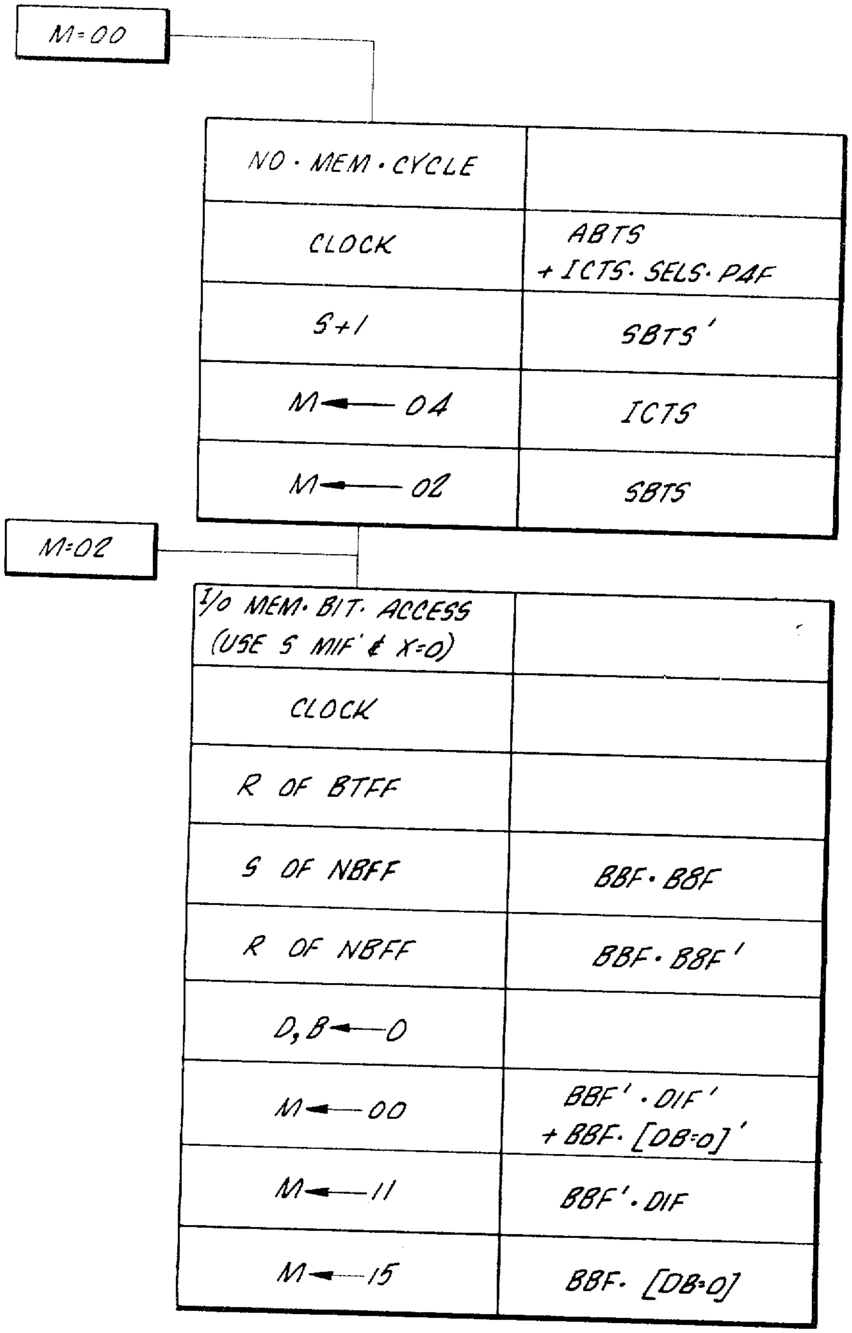
Figure 13:
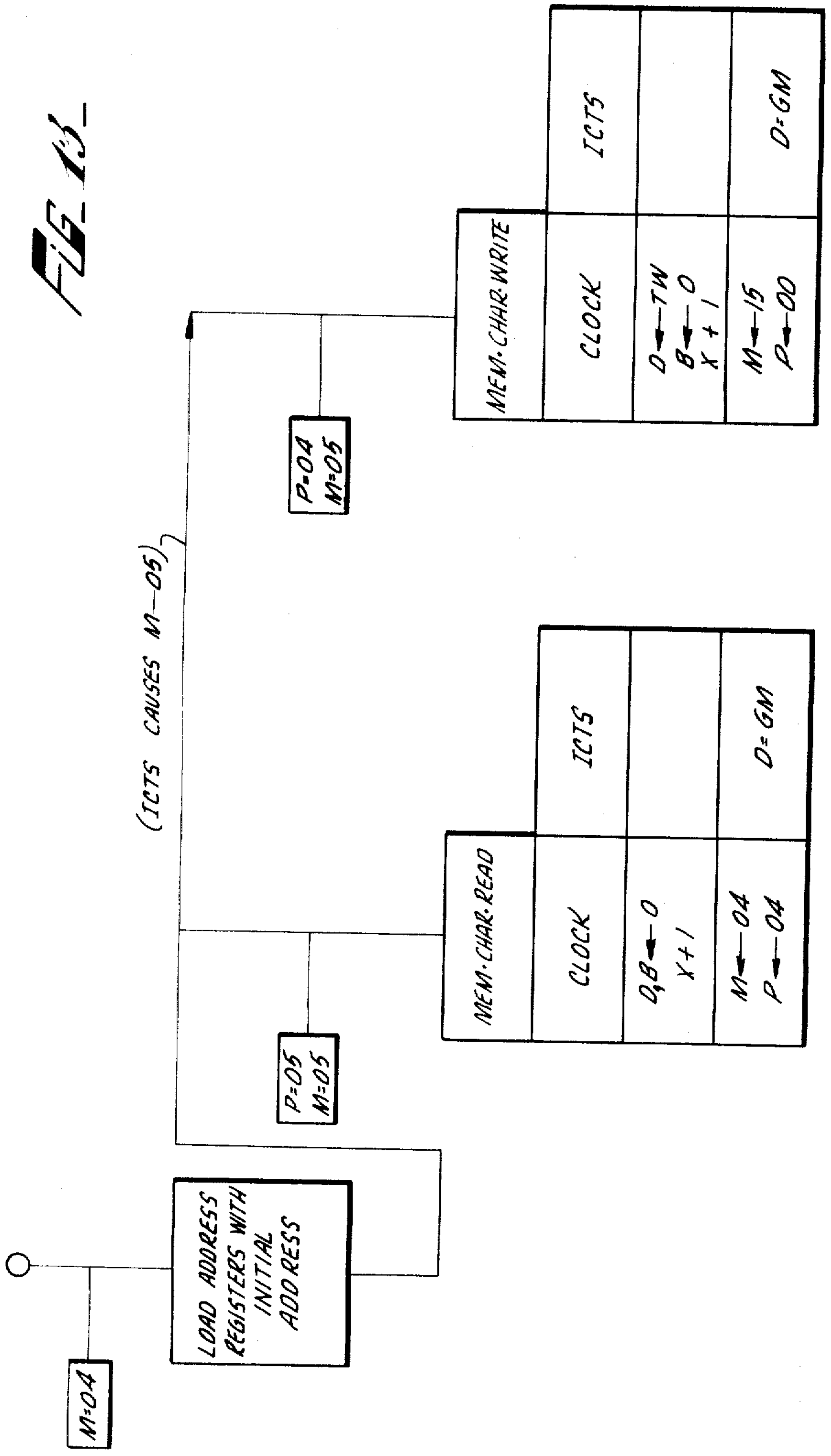

FIGS. 9A and 9B are schematic and block diagrams showing the memory and the details of some of the associated circuits of FIGS. 1A and 1B and embodying the form of the present invention illustrated in the general block diagram of FIG. 2; FIGS. 9A and 9B also contain an illustration showing an example of the successive contents of a memory location in the memory unit while a series of bits of a character are being translated into a character, parallel by bit, and written into the memory unit;

FIG. 9 is a sketch illustrating the manner in which FIGS. 9A and 9B are joined together;

FIG. 9C is a sketch illustrating the bit structure of characters being stored by the memory system of FIG. 9;

FIG. 10 is a schematic and block diagram showing the memory and the details of some of the associated circuits shown in FIGS. 1A and 1B and embodies the form of the present invention illustrated in the general block diagram of FIG. 3; FIG. 10 also contains an illustration showing an example of the successive contents of a memory location in the memory unit during an operation wherein the content of a memory location is read out and translated into a series of bits;

FIG. 10A is a sketch illustrating the bit structure of characters being read out of the memory system of FIG. 10;

FIG. 11 is a schematic and block diagram showing the memory and the details of some of the associated circuits shown in FIGS. 1A and 1B and embodies the form of the present invention illustrated in the general block diagram of FIGS. 4 and 5;

FIG. 12 is a flow diagram illustrating the sequence of operation of the form of the invention shown in FIGS. 2, 3, 9A, 9B, and 10 during which a series of bits are transferred between a memory location in the memory and the typewriter units of FIG. 1B; and FIG. 13 is a flow diagram which illustrates the sequence of operation of the form of the invention shown in FIGS. 4, 5, and 11 for transferring signals, a character at a time, between a memory location of the memory and the computer system.

GENERAL DESCRIPTION

Refer now to FIGS. 1A and 1B which show a block diagram, partly in schematic form, of an inquiry system which embodies the present invention. FIG. 1 is a sketch illustrating the manner in which FIGS. 1A and 1B are joined together. In order to simplify the reference thereto, FIGS. 1A and 1B will hereinafter be referred to as FIG. 1. A plurality of typewriter stations 10 are provided for sending inquiry messages to a computer system 20 and for receiving reply messages, in response to the inquiry messages, from the computer system 20. The inquiry and reply messages sent between the typewriter stations 10 and the computer system 20 are sent through a terminal unit composed of the equipment shown intermediate the typewriter stations 10 and the computer system 20.

There are eight typewriter stations 10, shown by way of example in FIG. 1, and which are referenced by the symbols 10–0 through 10–7. Each typewriter station is a conventional typewriter station well known in the computer art, which is characterized whereby a message may be formed thereon by striking a series of character keys (not shown). Each typewriter station has a translating mechanism (not shown) for forming a series of eleven digital signal bits, at the output circuit thereof, which represent each of the characters of the message being typed. Each of the typewriter stations also has a translating mechanism (not shown) for receiving an eleven bit digital signal, representative of a character of information, and for causing a character corresponding to the signals to be typed out on paper (not shown). The bit structure of the eleven bit character formed by a typewriter station is illustrated in the sketch of FIG. 9C and the bit structure of the eleven bit character received by the typewriter station is illustrated in the sketch of FIG. 10A. Six of the eleven bit characters represent information. Of the five remaining bits, some are unused, others are sometimes used in conjunction with the six information bits to represent information and some are used for timing purposes as described hereinafter.

Before considering the terminal unit, the characteristics of the typewriter stations 10 and the computer system 20 should be compared. The typewriter stations 10 send inquiry messages and receive reply messages in answer thereto formed of characters which are serial by bit, whereas the computer system 20 must receive the inquiry messages and sends reply messages to the typewriter stations composed of characters which are parallel by bit. An operator may form a character of an inquiry message at any point in time which he desires, whereas, the computer system 20 may only receive an inquiry message at the appropriate place in its steps of operation. Thus, the typewriter stations are asynchronous in operation with respect to each other. Also, the bits of characters formed at the typewriter stations 10 may overlap in time making it necessary for the terminal unit to accumulate all bits of a character from each individual typewriter station 10 into a complete character which is parallel by bit before presenting the characters to the computer system 20.

Additionally, the computer system 20 is characterized whereby a complete inquiry message must be presented thereto at the same time. To this end, the terminal unit collects all characters of each inquiry message together and presents the characters thereof to the computer system 20, one after the other. It should also be noted that typewriter stations 10 form the serial bits of a character at a much lower speed than the speed at which the computer system 20 receives and sends signals.

Consider now the flow of information through the terminal unit between the typewriter stations 10 and the computer system 20. Eight station control units 100 are provided, one for each of the typewriter stations 10. The station control units 100 are referenced by the symbols 100–0 through 100–7 corresponding to the associated typewriter stations 10–0 through 10–7. Each bit of each character of an inquiry message formed at one of the typewriter stations is sent via the corresponding station control unit, a selection circuit 500, and mode switches 700 to a memory means 200 where the bits are stored.

The memory means 200 includes a magnetic core memory 201 which contains a section corresponding to each of the typewriter stations 10. Each bit of a character of an inquiry message for a particular typewriter station is accumulated in one memory location of the corresponding section of the magnetic core memory unit 201 until a complete character is stored. Additionally, all characters of a complete inquiry message formed at a particular typewriter station are accumulated in the corresponding section of the magnetic core memory 201. After a complete inquiry message is accumulated in a section of the magnetic core memory 201, the characters of the inquiry message are read out thereof, a character at a time, and coupled to the computer system 20 via a data section 300–D of an information register 300 and line drivers 16.

The computer system 20 is responsive to an inquiry message for forming a reply message thereto. The characters of the reply message are formed by the computer system 20, in a conventional manner well known in the computer art, the details of which are not of concern in the present invention. The characters of the reply message are coupled back and stored into the same section of the magnetic core memory 201, from which the corresponding inquiry message was received, via the data section 300–D of the information register 300. The characters of a reply message are accumulated in the particular section of the magnetic core memory 201 until a complete reply message is stored therein.

Once the complete reply message is stored, the characters of the reply message are read out, serial by bit, and coupled back to the typewriter station from which the corresponding inquiry message was received via a B8FF flip-flop of the information register 300 and the appropriate station control unit.

The memory means 200 includes a set of sense amplifiers 204, and a set of information driver and inverter circuits 202 for reading out and storing information in a magnetic core memory 201. The sense amplifiers 204 are conventional sense amplifiers well known in the magnetic core memory art for amplifying signals from an addressed memory location of the magnetic core memory 201. The information register 300 contains gating (not shown in FIG. 1) for storing signals in flip-flops, the signals corresponding to the signals amplified by the sense amplifiers 204. The information driver and inverter circuits 202 are conventional information drivers well known in the magnetic core memory art for applying write signals to the magnetic core memory 201 for causing signals corresponding to the content of the information register 300 to be written into an addressed memory location of the magnetic core memory 201.

The memory means 200 includes magnetic core memory addressing circuitry 400 for addressing a particular memory location in the magnetic core memory 201 into which the content of the information register 300 is to be written and for addressing the particular memory location from which information is to be read and stored into the information register 300. Also with reference to FIG. 1, it should be noted that the output circuit SLINS' of the selection circuit 500, at which the bits of a character formed at one of the typewriter stations are applied, is coupled to the information driver and inverter circuits 202 via a set of mode switches 700. The mode switches 700 cause the serial bits of an inquiry message to be coupled directly to the information driver and inverter circuits 202, bypassing the information register 300.

INTRODUCTION FOR DISCUSSION OF SIMPLIFIED FORM OF INVENTION

The discussion in the four sub-sections which follow make reference to FIGS. 2, 3, 4 and 5 which show a simplified form of a portion of the inquiry system which is shown in detail and in a preferred form in the other figures. It is important to note that FIGS. 2, 3, 4 and 5 do not show the inquiry system in the exact same form as shown in the other figures but instead each of these figures illustrate, in simplified form, a portion of the circuit for causing a different mode of operation of the inquiry system of FIG. 1. The main portion of the inquiry system of FIG. 1 which FIGS. 2, 3, 4 and 5 show in simplified form is the memory means 200. Like reference numbers are used for parts shown in FIGS. 2, 3, 4 and 5 as are used for designating the corresponding parts in the other figures showing the details of a specific and preferred form of the inquiry system.

The following four sub-sections which discuss the simplified showing in FIGS. 2, 3, 4 and 5 are entitled "Typewriter Station to Memory Means Serial by Bit Input Mode," "Memory Means to Typewriter Station Serial by Bit Output Mode," "Memory Means to Computer System Parallel by Bit Output Mode" and "Computer System to Memory Means Parallel by Bit Input Mode."

TYPEWRITER STATION TO MEMORY MEANS SERIAL BY BIT INPUT MODE

There are four basic modes of operation in the inquiry system. The first of these modes of operation to be considered is the typewriter station to memory means serial by bit input mode wherein the serial bits of a character of an inquiry message being formed by one of the typewriter stations is translated to serial by bit and simultaneously stored in the memory means 200.

Refer now to FIG. 2. FIG. 2 is a general block diagram, partly in pictorial diagram form, illustrating the flow of the bits of a character of an inquiry message formed by one of the typewriter stations as the bits are accumulated in the magnetic core memory 201. FIG. 2 shows the magnetic core memory 201 and the associated information register 300, the information driver and inverter circuits 202, and the sense amplifiers 204. For purposes of general explanation, the magnetic core memory 201 is shown with a plurality of squares arranged in rows and in columns. Each row represents a memory cell in the magnetic core memory 201. Moving from left to right, the columns represent the successive storage content of one particular memory location in the magnetic core memory 201 as the bits of an input character are accumulated therein.

For purposes of general explanation, nine memory cells are shown in FIG. 2 and are referenced by the symbols #1 through #9. A memory cell (or square) in the memory 201 which does not contain a character is shown blank in FIG. 2 in order to indicate the fact that a bit of the incoming word has not as yet been stored therein.

Additionally, for purposes of general explanation, nine sense amplifiers are shown in FIG. 2 and are referenced by the symbols #1 through #9. Further, for purposes of general explanation nine storage cells in the information register 300 are shown and similar to the memory cells and the sense amplifiers, the storage cells of the information register 300 are referenced by the symbols #1 through #9. Similarly, nine information driver and inverter circuits are shown in the information driver and inverter circuits 202 and are referenced by the symbols #1 through #9. It should be noted that although only nine information driver and inverter circuits, nine sense amplifiers, nine cells in the information register, and nine cells in the magnetic core memory are shown for purposes of explanation and are referenced by the symbols #1 through #9, there are actually twelve of each of these items and the reference numbers and symbols in the detailed block diagrams do not correspond with the symbols in the general block diagram of FIG. 2.

It is quite important to note the following connections for the various circuits shown in FIG. 2. Memory cells #1 through #9 are coupled to the input of sense amplifiers #1 through #9. The output circuits of the sense amplifiers #1 through #9 are coupled to the input circuits of the storage cells #1 through #9 of the information register 300. Also, the output circuits of the information driver and inverter circuits #1 through #9 are coupled to memory cells #1 through #9. In contrast, however, the output circuits of the information register cells of #1 through #8 are coupled to the input circuits of information driver and inverter circuits #2 through #9.

With this arrangement each time the content of a memory cell in the magnetic core memory 201 is read out through the sense amplifiers 204 and stored in the information register 300, the content of that memory location is rewritten via the information driver and inverter circuits 202 in the same memory location but displaced one memory cell in a downward direction as shown in FIG. 2. The actual connection between the information register 300 and the information driver and inverter circuits is made by the mode switches 700 in FIG. 1. However, for purposes of describing the invention, a direct connection is shown in FIG. 2.

For purposes of explanation, the typewriter stations 10, the station control units 100 and the mode switches 700 are shown as a source of digital signals 22 in FIG. 2. The source of digital signals 22 is coupled to the input circuit 24 of the information driver and inverter circuits #1.

Consider now the operation of the system shown in FIG. 2. Assume that the character 101101001 is to be stored in the memory location of the magnetic core memory 201 illustrated in FIG. 2. The source of digital signals 22 provides the digital signals to the input circuit 24 bit by bit beginning with the least significant bit. Each time a signal bit is applied to the input circuit 24, the memory location is addressed and the content thereof is read out and stored in the information register 300 and rewritten back into the same memory location but shifted one memory cell.

Upon receipt of the first bit of the character to be written into the magnetic core memory 201, magnetic core memory 201 is addressed and the bit is written into memory cell #1. Subsequently, the source 22 provides the second bit of the character and the memory location is again addressed and the content thereof read out via the sense amplifiers 204 and stored into the information register 300. At this point, cell #1 of the information register 300 contains the first bit of the character, which bit was previously stored in memory cell #1. The content of the information register 300 is then written back into the addressed memory location along with the second bit of the character. However, due to the connection between the information register 300 and the information driver and inverter circuits 202, the one bit previously stored in memory cell #1 is shifted down one position in the same memory location as illustrated in FIG. 2.

At this point the memory location of the magnetic core memory 201 contains the first and second bits of the character being stored and the bits are stored in memory cells #2 and #1 respectively. Upon receipt of the third bit of the character, the magnetic core memory 201 is again addressed and the contents of the addressed memory location is read out, stored in the information register 300 and subsequently the third bit of the character along with the first and second bits (stored in the information register 300) are written back into the addressed memory location. This sequence of operation continues for each bit of the input character until all bits of the character are accumulated in the addressed memory location of the magnetic core memory 201.

It should be noted that there are 1 through $n$ memory cells in the memory location of the magnetic core memory 201, 1 memory cell for each bit of the character being accumulated in the memory location. The information register 300 may be referred to as a temporary information storage means and contains at least 1 through $n-1$ storage cells. The $n$th storage cell of the information register 300 is not essential to the present invention in the embodiment of FIG. 2. It should also be noted that the content of memory cell #9 need not be read out during the process since the last memory writing operation causes the bit finally stored in memory cell #9 to be transferred from storage cell #8 of the information register 300 into memory cell #9. In summary, the addressing means for the magnetic core memory 201 addresses a memory location concurrently with each new bit formed by the source 22 causing the new bit to be written in memory cell #1 and causing the content of at least memory cells 1 through $n-1$ of the addressed location to be read out, stored in the information register 300 and rewritten into the addressed memory location into memory cell 2 through $n$. Thus, in brief, the memory system of FIG. 2 operates as a serial to parallel, translator for the bits of a serial character and also shifts information within the memory from cell to cell in the addressed memory location.

MEMORY MEANS TO TYPEWRITER STATION SERIAL BY BIT OUTPUT MODE

Refer now to FIG. 3 and consider the second mode of operation referred to as the memory means to typewriter station serial by bit output mode of operation. During this mode a character contained in the magnetic core memory 201 is translated from parallel by bit to serial by bit and sent back to one of the typewriter stations 10.

FIG. 3 shows a general block diagram which illustrates the flow of signal bits as the bits of a character are read out of the magnetic core memory 201 and sent back to a typewriter station. The block diagram of FIG. 3 is quite similar to the block diagram of FIG. 2, except that eleven memory cells are shown and, corresponding thereto, eleven sense amplifiers, eleven storage cells in the information register 300, and eleven information driver and inverter circuits, rather than nine of each. The eleven storage cells of the information register 300, the eleven information driver and inverter circuits 202, the eleven memory cells and the eleven sense amplifiers 204 are referenced by the symbols #1 through #11 similar to the circuits of FIG. 2. The main differences between the block diagrams of FIG. 2 and FIG. 3 are that the source of digital signals 22 and the input circuit 24 are removed and an output circuit 28 of the storage cell #11 is connected to a receiving device 26. The receiving device 26 is shown for purposes of explanation in FIG. 3 and represents the typewriter stations 10 and the station control units 100 of FIG. 1.

Consider the operation of the system of FIG. 3. Assume that the memory location which is to be addressed and read out for the receiving device 26 contains the character 10110100100 in memory cells #1 through #11 as illustrated in FIG. 3. The content of the memory location is illustrated in the first column of the memory 201. The other columns of the memory 201, moving from left to right, illustrate the sequential content of the same memory location as the character is read out and serialized. The most significant bit of the character is contained in memory cell #1 and the least significant bit in memory cell #11. As a bit is shifted out of a memory cell and if no bit is shifted into the memory cell, the square illustrating the particular memory cell is left blank to indicate no useful information is contained therein.

The memory location is addressed once for each bit of the character which is to be read out, serialized, and sent to the receiving device 26. Each time the memory location is addressed the content of the memory location is read out and stored in the information register 300 via the sense amplifiers 204 and the storage content of the information register 300 is rewritten back in the same memory location. However, due to the interconnection between the information register 300 and the information driver and inverter circuits 202, the character is shifted 1 memory cell from which it was originally read. Additionally, the content of memory cell #11 which is stored in storage cell #11 of the information register 300 is coupled via the output circuit 28 to the receiving device 26. Thus, the bits of the character which are stored in parallel in the addressed memory location are successively in order, beginning with the least significant bit, shifted into memory cell #11 and subsequently stored in cell #11 of the information register 300 for transfer to the receiving device 26. After the magnetic core memory 201 has been addressed once for each of the bits of the character, all bits of the memory location will have been stored, one by one, in storage cell #11 and transferred to the receiving device 26. Thus, the bits of the character contained in the addressed memory location are serialized by storing the bits one by one in storage cell #11 of the information register 300.

An important feature of the invention, as disclosed in the block diagrams of FIGS. 2 and 3, is that the contents of a memory location in the magnetic core memory 201 may be shifted about and the bits of the character rearranged merely as a function of the interconnection between the information register 300 and the information driver and inverter circuits 202. For example, the bit stored in memory cell #1 could be shifted to memory cell #4 or one of the other memory cells by appropriately connecting the output of storage cell #1 of the information register. These and other shifting schemes may be devised all within the scope of the present invention. Also, a similar effect can be obtained by changing the interconnection between the sense amplifiers 204 and the information register 300, or by changing the interconnection between the information driver and inverter circuits 202 and the magnetic core memory 201, or by changing the connection between the magnetic core memory 201 and the sense amplifiers 204.

MEMORY MEANS TO COMPUTER SYSTEM PARALLEL BY BIT OUTPUT MODE

The third mode of operaaion of the inquiry system is the memory means to computer system parallel by bit output mode of operation wherein the characters of an inquiry message, which are stored in the memory 201, are read out and transferred to the computer system 20.

Each memory location of the magnetic core memory 201 shown in FIG. 1 has two sections for storing two six bit characters of information. As pointed out hereinabove, the computer system 20 receives inquiry messages a character at a time. Therefore, the inquiry system must be arranged for reading the two inquiry characters out of each memory location and presenting the characters one by one to the computer system 20. To this end, the memory system is arranged for reading out the characters in each memory location twice and rewriting the characters back into the same memory location but shifted in a novel manner so that the two characters are both sequentially stored in the same half of the information register 300.

Refer now to FIG. 4. FIG. 4 shows a block diagram which illustrates the flow of information between the magnetic core memory 201 and the computer system 20 during this mode of operation. Similar to FIG. 2 the block diagram of FIG. 4 shows the magnetic core memory 201, the information register 300, the information driver and inverter circuits 202 and the sense amplifiers 204. However, in contrast to FIG. 2, magnetic core memory 201 is shown with the full complement of twelve memory cells as is actually contained in each memory cell of the magnetic core memory 201 shown in FIG. 1. The twelve memory cells are for storing two six bit characters.

Similarly, there are twelve storage cells in the information register 300, twelve information driver and inverter circuits, and twelve sense amplifiers, for handling the transfer of two six bit characters. Similar to the block diagram of FIG. 2, the output circuit of sense amplifiers #1 through #12 are coupled to the input circuits of storage cells #1 through #12 of the information register 300 and the output circuits of the information driver and inverter circuits #1 through #12 are coupled to storage cells #1 through #12.

However, in contrast to the block diagram of FIG. 2, the output circuits of storage cells #1 througn #6 of the information register 300 are cross coupled to information driver and inverter circuits #7 through #12 and the output circuits of the storage cells #7 through #12 are cross coupled to the input circuits of information driver and inverter circuits #1 through#6. Also, the output circuit of the storage cells #1 through #6 of the information register 300 is coupled through the line drivers 16 to the computer system 20.

It should be noted that the reference symbols affixed, in FIG. 4, to the storage cells of the information register 300, the individual information driver and inverter circuits, the memory cells and the individual sense amplifiers do not necessarily correspond with the symbols used to reference these elements in the other drawings but are shown in FIG. 4 for purposes of explanation of the mode of operation under consideration.

Consider now the operation of the block diagram shown in FIG. 4. The block representing the magnetic core memory 201 is divided into two columns having two rows, for purposes of illustration. The first row illustrates the successive contents of memory cells #1 through #6 and the second row illustrates the successive contents of memory cells #7 through #12. Initially a first character is stored in memory cells #1 through #6 and a second character is stored in memory cells #7 through #12. In operation each memory location is addressed twice for reading out the contents thereof. Each time the memory is addressed, two cycles of operation take place including a read operation during which the content of a memory location is read out and, in effect, erased from the memory and a write cycle. Referring specifically to FIG. 4, the first time the indicated memory location is addressed the first and second characters are read out and stored in the same relative position in the information register. Thus, the first character is stored in storage *cells* #1 through #6 of the information register 300 and is transferred via the line drivers 16 to the computer system 20. Subsequently, the two characters are written back into the same memory location from which they were read. However, due to the manner in which the cells #1 through #6 and #7 through #12 of the information register 300 are cross connected with the information driver and inverter circuits #1 through #6 and #7 through #12, the relative positions of the two characters are reversed when written into the memory 201. Therefore, when the memory location is again addressed the characters are stored in the information register 300 with the second character in storage cells #1 through #6 causing the second character to be sent out via the line drivers 16 to the computer system 20.

COMPUTER SYSTEM TO MEMORY MEANS PARALLEL BY BIT INPUT MODE

The fourth mode of operation of the inquiry system of FIG. 1 is the computer system to memory means parallel by bit input mode of operation wherein characters of a reply message are transferred from the computer system 20 to the magnetic core memory 201 for storage. As pointed out hereinabove, the transfer of inquiry messages between the computer system 20 and the magnetic core memory 201 is serial by character and parallel by bit. Thus, the inquiry system must be arranged for storing two separate characters, received at different points in time, into one memory location. To this end, the novel memory system is arranged whereby the bits of a character are shifted which being written so as to allow two characters to be accumulated in one memory location.

Refer now to FIG. 5 which is a block diagram illustrating the operation of the inquiry system during this mode of operation. It will be noted that the information reigster 300, the information driver and inverter circuits 200, the magnetic core memory 201 and the sense amplifiers are shown and arranged quite similar to the corresponding circuits in FIG. 5, except that the sense amplifiers #1 through #6 are not connected to the storage cells #1 through #6 of the information register 300. Instead the computer system 20 is shown connected to storage cells #1 through #6 of the information register 300 for storage of reply characters therein. Similar to FIG. 4, the block representing the magnetic core memory 201 in FIG. 5 is divided up into two rows and two columns. The columns represent the successive storage content of a single addressed memory location in the magnetic core memory 201. The two rows represent the sections in which two characters are stored in the memory location.

In operation, each memory location is addressed twice for writing two successive characters of a reply message formed by the computer system 20. The addressing takes place concurrently with the application of each of the two characters to the information register 300. During each addressing, a read cycle followed by a write cycle takes place. The interconnections between the information register 300 and the information driver and inverter circuits 202 are such that a character stored in one section of a memory location is read out and when rewritten in the memory is written in the other section of the addressed memory location. In this manner the computer system 20 only need be coupled to storage cells #1 through #6 of the information register 300 and the characters of the reply messages stored therein.

DETAILED DESCRIPTION

Refer now to FIG. 1. The inquiry system of FIG. 1 includes a control unit 600. The control unit 600 is the primary control device for sequencing the operation of the inquiry system.

A portion of the circuits of the control unit 600 is broken out and shown in dashed lines in FIG. 1 for purposes of explanation. These circuits generate a signal indicating that a typewriter station is forming a bit of a character of an inquiry message which is to be stored in the memory means 200 and for generating a signal which indicates that a typewriter station is ready to receive a bit of a character of a reply message. These gates also indicate when the state of an S counter 14 corresponds to the typewriter station sending or receiving a bit of a character.

To this end, an OR gating circuit 602 is shown having eight input circuits connected to eight output circuits, one for each of the station control units 100. The output circuits of the station control units are referenced by the symbols BIT #0 through BIT #7. Whenever a typewriter station 10 forms a bit of a character which is to be stored in the memory means 200 the corresponding station control unit 100 forms a control signal at the corresponding BIT output circuit thereof. The OR gating circuit 602 is responsive to the signal for forming a control signal at the ABTS output circuit thereof indicating that one of the typewriter stations 10 is forming a control signal for storage in the memory means 200.

Also included in the control unit 600 is an OR gating circuit 603 having input circuits connected to AND gating circuits 610 through 617. The AND gating circuits 610 through 617 have input circuits connected to the output circuits BIT #0 through BIT #7, respectively. Additionally, the AND gating circuits 610 through 617 have input circuits connected to output circuits S=0 through S=7, respectively, of an S decoding circuit 12.

To be explained in detail, the S decoding circuit 12 is a conventional decoding circuit and has its input circuit connected to the output circuit of the S counter 14. The S counter 14 is controlled by timing which causes it to scan through a sequence of eight states, each state corresponding to one of the typewriter stations 10. The S decoding circuit 12 is arranged for applying a control signal at one of the output circuits thereof depending on the state of the S counter 14. The output circuits S=0 through S=7 of the S decoding circuit 12 correspond to typewriter stations 10–0 through 10–7, respectively.

Refer again to the gating circuits 603 and 610 through 617. A control signal is formed at the SBTS output circuit of the OR gating circuit 603 whenever a control signal is formed at the BIT output circuit of a station control unit and the S counter 14 is in a state corresponding to the typewriter station associated with the particular station control unit. For example, if the S counter 14 is in a state causing a control signal at the S=0 output circuit and a control signal is applied at the BIT #0 output circuit of the station control unit 100–0, the AND gate 610 will apply a control signal to the OR gate 603 causing the OR gate 603 to apply a control signal at the SBTS output circuit.

Refer now to the gating in the control unit 600 for controlling the operation of the S counter 14. An AND gate 662 and a signal inverter circuit 664 are provided for applying count control signals at an S+1 input circuit for controlling the counting of the S counter 14. The gate 662 has input circuits connected to the inverter circuit 664 and to the output circuit M=00 (see FIGS. 6A and 6B). The inverter 664 is a conventional signal inversion circuit having an input circuit connected to the SBTS output circuit of the control unit 600 (see FIG. 1). The S counter 14 also has an input circuit connected to the CCP output circuit of the clock generator 623 (see FIGS. 6A and 6B).

The S counter 14 counts from one state to the next in response to a control signal from the gate 662 in coincidence with a clock pulse. Functionally, the S counter 14 receives a control signal at its S+1 input circuit whenever the OR gate 603 does not apply a control signal at its SBTS output circuit and the M signal generator 621 (see FIGS. 6A and 6B) forms a control signal at its M=00 output circuit.

Figure 6A:
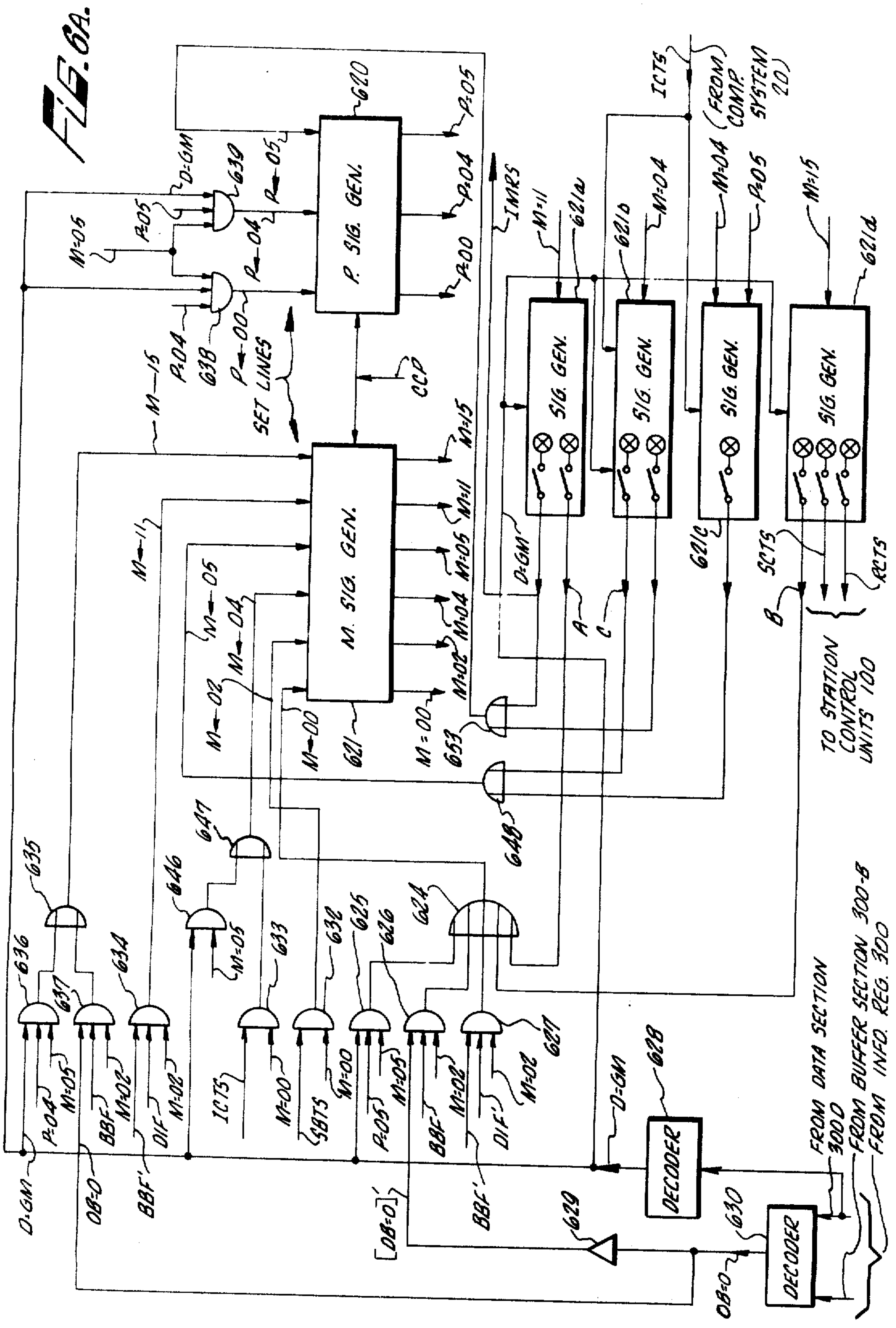
FIGS. 6A and 6B are schematic and block diagrams showing a portion of the details of the control unit shown in FIG. 1B.
Figure 6B:
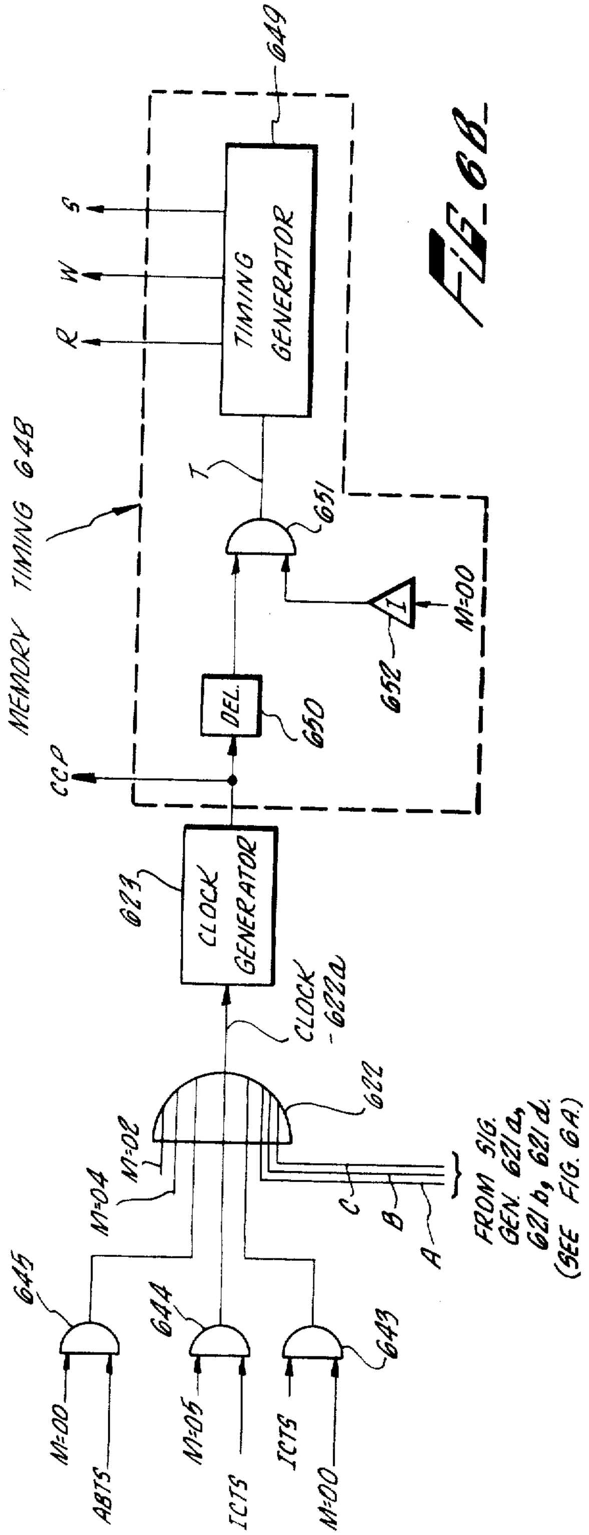

FIGS. 6A and 6B show other details of the control unit 600. In order to simplify the reference thereto, FIGS. 6A and 6B are hereinafter referred to as FIG. 6. With reference to FIG. 6 it will be noted that there are six primary timing generators referred to as the M signal generator 621, the P signal generator 620 and signal generators **621*a*, 621*b*, 621*c* and 621*d***.

The M signal generator 621 has six states of operation and corresponding thereto six output circuits which are represented by the symbols M=00, M=02, M=04, M=05, M=11, and M=15. The M signal generator 621 forms a control signal at one of the output circuits thereof when in the corresponding state of operation. The M signal generator 621 is a conventional signal generator well known in the computer art, which is set into one of its states of operation whenever a control signal is applied at one of six input circuits. The input circuits are referred to as set lines and are referenced by the symbols M◁−00, M◁−02, M◁−04, M◁−05, M◁−11, M◁−15. The M signal generator 621 is set into a state wherein a control signal is formed at the corresponding output circuit whenever the correspondingly numbered set line receives a control signal concurrently with the formation of a clock pulse by a clock generator 630.

Consider now the gating circuits for applying control signals to the set lines for the M signal generator 621. The M◁−00 input circuit is connected through an OR gating circuit 624 to the output circuits of AND gating circuits 625, 626 and 627 and the output circuits of the signal generators 621*b* and 621*d*. The AND gating circuit 625 has its input circuit connected to the M=05 output circuit of the M signal generator 621, a P=05 output circuit of the P signal generator 620, a D=GM output circuit of a decoder 628.

The decoder 628 is a conventional decoder circuit and has its input circuit connected to the output circuits of the data section 300–D of the information register 300. It is arranged for forming a control signal at the D=GM output circuit whenever a "group marker character" is stored in the data section 300–D of the information register 300. To be explained in the following description, a group marker character is a unique character which designates the end of either an inquiry message or a reply message.

The AND gating circuit 626 has its input circuits connected to the [DB=0]′ output circuit of a signal inverter circuit 629, the BBF output circuit of the BBFF flip-flop of the information register 300 and the M=02 output circuit. A decoding circuit 630 is connected to the inverter circuit 629 and is a conventional decoding circuit having its input circuits connected to the output circuits of the data section 300–D and the buffer section 300–B of the information register 300. The decoding 630 is arranged, in conjunction with the inverter circuit 629, to form a control signal at the output circuit of the inverter circuit 629 whenever 0 bits are not being stored in all flip-flops of the data section 300–D and in flip-flops B1FF through B4FF and BAFF of the information register 300.

The AND gating circuit 627 has its input circuits connected to the BBF′ output circuit of the BBFF flip-flop and the DIF′ output circuit of the DIFF flip-flop of the information register 300 and the M=00 output circuit.

The set line M◁−02 is connected to the output circuit of AND gating circuit 632, having input circuits connected to the output circuits SBTS (see FIG. 1) and the M=00. The M◁−04 set line is connected through an OR gating circuit 647 to AND gating circuits 633 and 646. The AND gating circuits 633 has its input circuit connected to output circuits M=00 and ICTS. ICTS is an output circuit from the computer system 20 on which a control signal is applied whenever computer system is requesting an inquiry character from the memory means or is providing a character for storage in the memory means. The gating circuit 646 has input circuits connected to output circuits D=GM of the decoder 628 and to the M=05 output circuit.

The M◁−05 set line is connected through an OR gate 248 to the signal generators 621*b* and 621*c*. The M◁−11 set line is connected to an AND gating circuit 634 having input circuits connected to the output circuits BBF′ of the flip-flop BBFF, the DIF output of the DIFF flip-flop and the output circuit M=00. The set line M◁−15 is connected to an OR gating circuit 635, having input circuits connected to AND gating circuits 636 and 637. The AND gating circuit 636 has its input circuits connected to output circuits D=GM, P=04, and M=05. The AND gating circuit 637 has input circuits connected to output circuits DB=0, BBF and M=02.

Refer now to the P signal generator 620. The P signal generator 620 has three states of operation and correspondingly thereto three output circuits and three set lines. An output circuit of the P signal generator 620 receives a control signal when the P signal generator is in the corresponding state of operation. The output circuits of the P signal generator 620 are referenced by the symbols P=00, P=04 and P=05, and the set lines for setting the P signal generator in the corresponding states of operation are referenced by the symbols P◁—00, P◁—04, and P◁—05, respectively. The set lines P◁—00 and P◁—04 are connected to AND gates 638 and 639. The set line P◁—05 is connected through an OR gating circuit 653 to the signal generators 621*a* and 621*b*. The AND gate 638 has input circuits connected to the output circuits P=04, M=05 and D=GM. The AND gate 639 has input circuits connected to the output circuits M=05, P=05 and D=GM.

The P signal generator 620 is a conventional signal generator and is characterized whereby it is set into one of its three states of operation when a control signal is applied by at corresponding set line concurrently with the application of a clock pulse thereto by the clock pulse generator 623.

The M signal generator 621 and the P signal generator 620 are provided for sequencing the inquiry system during its four modes of operation. This aspect of the inquiry system will be described in detail in the subsequent description. In addition, the states wherein the M signal generator 621 applies control signals at the output circuits M=04, M=11 and M=15 cause the signal generators 621*a*, 621*b*, 621*c* and 621*d* to generate additional timing signals, which cause additional operations to take place which are described in detail in the subsequent description. However, the details of the circuitry in the circuits 621*a*, 621*b*, 621*c* and 621*d* are not described and need not be described in detail for a full understaning of the present invention.

Refer now to the clock system and the memory timing shown in FIG. 6. The clock generator 623 is not a free-running clock pulse generator but instead only forms a clock pulse on demand. In other words, the clock pulse generator 623 forms a clock pulse at its CCP output circuit whenever a control signal is applied at its input circuit causing it to form the clock pulse. The clock pulse generator 623 has its input circuit connected to an OR gating circuit 622. The OR gate 622 has input circuits connected to the output circuits of AND gating circuits 643, 644 and 645, and to the output circuits M=04 and M=02.

The gate 643 is connected to the output circuits M=05 and ICTS. The gate 644 has input circuits connected to the output circuit ICTS and M=05. The AND gate 645 is connected to the output circuits ABTS (see FIG. 1) and M=00. In this manner the clock pulse generator 623 receives a control signal from the OR gate 622 and forms a clock pulse at the CCP output circuit whenever any one of its input circuits applies a control signal thereto.

Refer now to the memory timing unit 648. The memory timing unit 648 has a delay circuit 650 for applying control signals to a timing generator 649. The input circuit of the delay circuit 650 is connected to the CCP output circuit. The output circuit of the delay circuit 650 connected to the timing generator 649 through an AND gate 651. The gate 651 also has an input circuit connected to an inverter circuit 652. The inverter circuit 652 is a conventional signal inverter circuit and has an input circuit connected to the M=00 output circuit.

The delay circuit 650 is a conventional time delay circuit which is responsive to a clock pulse for applying a control signal via the T output circuit thereof and the gate 651 to the timing generator 649 after a short time delay, as described in more detail hereinbelow.

The timing generator 649 is the generator which generates the read write and strobe signals for the magnetic core memory 201.

Figure 6C:
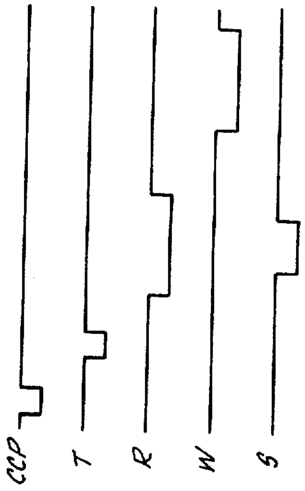
FIG. 6C is a timing diagram illustrating the sequence of operation of the magnetic core memory unit of FIG. 1B.

The generator 649 has three output circuits represented by the symbols R, W and S at which memory control signals are formed. To be explained in a subsequent description, the timing generator 649 forms conventional read, write and strobe control signals at its R, W and S output circuits which control and sequence the operation of the magnetic core memory 201 in a conventional manner well known in the computer art. FIG. 6C illustrates the sequence with which control signals are formed at the CCP, T, R, W and S output circuits.

Refer now to the memory means 200 as shown in FIG. 1. The addressing means 400 forms the addressing signals for selecting a particular memory location in the magnetic core memory 201 for reading and writing. The magnetic core memory 201 has a plurality of magnetic cores (see FIG. 7). These are sixteen planes of cores each of which has thirty-two columns of cores. To be explained in detail, the two planes go to make up one section in the memory. One of the planes in each section has the input/output memory location in which characters are stored which are being transferred between the typewriter stations and the memory. The addressing means 400 includes a Y register 402 for selecting a particular plane in the magnetic core memory 201 and X register 404 for selecting a particular column in the magnetic core memory 201. The Y register 402 is a conventional register having four flip-flops (not shown) for selecting one of the sixteen possible planes. The Y register 402 is coupled through a Y gate and decoder circuit 406 to the input circuit of plane select drivers 206. The Y register 402 also includes gating (not shown) for storing signals corresponding to the state of the S counter 14. However, this latter feature of the Y register 402 is not explained in detail herein as it is not necessary for a complete understanding of the present invention. However, suffice it to say the Y register gating causes the signals to be stored in response to a control signal at the M=05 output circuit.

The X register 404 is a conventional flip-flop register having five flip-flops which are referenced by the symbols X0FF, X1FF, X2FF, X4FF, and X8FF. The X register 404 has gating (not shown) for storing a four bit character from the information register 300 in response to control signals from the control unit 600. This feature of the X register 404 is not explained in detail herein as these details are not necessary for a complete understanding of the present invention. The X register 404 also contains gating (not shown) for causing the flip-flops of the X register to count through thirty-two possible states. The count gating circuits of the X register 404 are responsive to a control signal at the X+1 input circuit thereof for counting from one state to the next in response to a clock pulse at the CCP output circuit of the clock pulse generator 623 (see FIG. 6). The X+1 input circuit of the X register 404 is connected to the M=05 output circuit of the signal generator 621.

The output circuits of the X1FF, X2FF, X4FF and X8FF flip-flops of the X register 404 are coupled to the input of an X gate and decoding circuit 408. The X gate and decoding circuit 408 is coupled to the input circuit of column-select drivers 208. An address occupies all flip-flops in the X register 404. However, the X gate and decoding circuit 408 is arranged for normally decoding the combined states of only the X1FF, X2FF, X4FF, and X8FF flip-flops and applying a corresponding address signal to the column-select drivers 208 causing the corresponding column in the magnetic core memory 201 to be addressed.

Also, the X gate and decoding circuit 408 includes conventional gating which is responsive to a control signal formed at the M=02 output circuit for addressing column 1 of the magnetic core memory 201 regardless of the state of the X register 404. To be explained in detail, column 0 of one plane in each section of magnetic core memory 201 is the input-output memory location of the section.

The Y gate and decoding circuit 406 is arranged for decoding the state of the Y register 402 and applying a control signal to the plane select drivers 206 corresponding to the state of the Y register. The Y gate and decoding circuit 406 is arranged for applying the control signal in response to a control signal at the M=05 output circuit of the M signal generator 621 (see FIG. 6).

Also coupled to the plane select drivers 206 is an S gate and decoding circuit 610. The S gate and decoding circuit 610 has its input circuits connected to the output circuit of the S counter 14 and the M=00 output circuit of the M signal generator 621. The S gate and decoding circuit 610 is arranged for applying a control signal to the plane select drivers 206 causing it to address the particular plane of the section specified by the S gate and selection circuit 610 which has the input/output memory location. The S gate and decoding circuit is composed of conventional gating circuits (not shown) which are well known in the computer art for applying the control signal to the plane select driver circuit 206 in response to a control signal at the M=02 output circuit.

Figure 7:
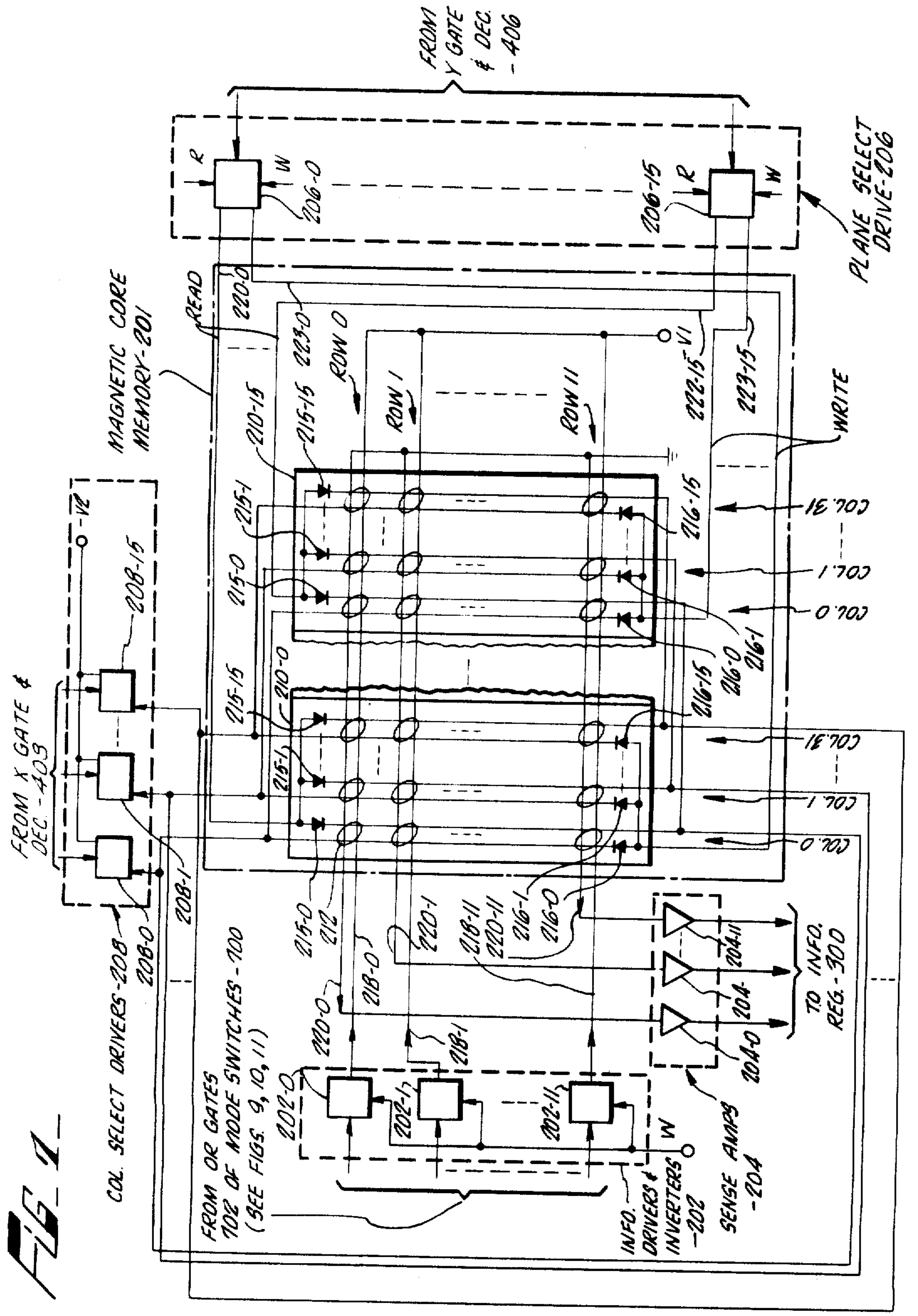
FIG. 7 is a schematic and block diagram showing the details of the magnetic core memory unit along with the detailed arrangement of the column and plane select drivers, the information driver and inverter circuits and the sense amplifiers and associated gating which are contained in the inquiry system of FIG. 1.

Refer now to FIG. 7 and consider the details of the magnetic core memory 201 and the associated information driver and inverter circuits 202, the sense amplifiers 204, the plane select drivers 206, and the column select drivers 208. The magnetic core memory 201 is composed of a plurality of donut-shaped magnetic cores 212. Each core 212 has a substantially rectangular hysteresis loop capable of being saturated in one of two magnetic states for storing binary-coded digital bits of information in a conventional manner well known in the computer art. The magnetic core memory 201 has sixteen planes of magnetic cores represented by the symbols 210–0 through 210–15. Each plane has thirty-two columns and twelve rows of magnetic cores 212. The columns are identified by the symbols COL.0 through COL.31 and the rows are represented by the symbols ROW.0 through ROW.11. Only planes 210–0 and 210–15 are actually shown in FIG. 7 for the purposes of explanation.

Electrical current carrying conductors are threaded through the magnetic cores 212 including sense and write conductors. Write conductors 218–0 through 218–11 are threaded through the magnetic cores of rows ROW.0 through ROW.11 of each of the planes 210–0 through 210–15. One end of the write conductors 218–0 through 218–11 are connected to the output circuit of individual information driver and inverter circuits 202–0 through 202–11 of the information driver and inverter circuits 202. The opposite end of the write conductors 218–0 through 218–11 are connected to a negative source of potential represented by the symbol −V1.

Sense conductors 220–0 through 220–11 are threaded through rows ROW.0 through ROW.11 of each of the planes 210–0 through 210–15. One end of the sense conductors 220–0 through 220–11 are connected to the input circuits of individual sense amplifiers 204–0 through 204–11, respectively, of the sense amplifiers 204. The opposite end of the sense conductors 220–0 through 220–11 are connected together in common to ground (0 volts potential).

Two sets of rectifier diodes 215–0 through 215–15 and 216–0 through 216–15 are provided for COL.0 through COL.31, respectively, of each of the planes 210–0 through 210–15. The anode electrodes of the diodes 215–0 through 215–15 in each individual plane are connected together in common. Similarly, the anode electrodes of the diodes 216–0 through 216–15 in each individual plane are separately connected together in common.

The plane select drivers 206 include sixteen individual plane select driver circuits which are referenced by the symbols 206–0 through 206–15. Also, the column select drivers 208 include sixteen individual driver circuits which are referenced by the symbols 208–0 through 208–15. The common anode electrodes of the diodes 215 in planes 210–0 through 210–15 are connected to read output circuits 222–0 through 222–15 of the driver circuits 206–0 through 206–15, respectively. Similarly, the common anode electrodes of the diodes 216 in planes 210–0 through 210–15 are connected to write output circuits 223–0 through 223–15 of the driver circuits 206–0 through 206–15, respectively. The cathode electrodes of the diodes 215 and 216 are coupled to the cores in the corresponding columns by means of current carrying conductors. For example, the cathode electrode of the diode 215–0 passes through the opening in each of the cores in COL.0.

The opposite end of the conductors which are connected to diodes 216–0 through 216–15, respectively, in plane 210–0 are connected to the opposite end of the conductors connected to diodes 216–0 through 216–15, respectively, in each of the other fifteen planes. Similarly, the opposite end of the conductors connected to diodes 215–0 through 215–15, respectively in plane 210–0 are connected to the opposite end of the conductors connected to diodes 215–0 through 215–15, respectively, in each of the other fifteen planes.

The conductors connected together in common and connected to the cathodes of diodes 215–0 through 215–15, respectively, in each of the planes are connected to input circuits of column select drivers 208–0 through 208–15. Similarly, the conductors connected together in common and connected to the cathodes of diodes 216–0 through 216–15, respectively, are connected to the same inputs of column-select and drivers 208–0 through 208–15. Thus, for example, the conductors in COL.1 of plane 210–0, which are connected to the cathodes of diodes 215–0 and 216–0, are also connected together and are connected in common to the input of column-select drivers 208.

Consider now the operation of only the system shown in FIG. 7 along with the operation of the memory timing unit 648. Whenever a memory access is to take place the gate 651 applies a control signal to the timing generator 649 (see FIG. 6) causing control signals at the output circuits in the order and form shown in FIG. 6C.

The read signal at the R output circuit energizes the select drivers 206. The select drivers 206 are composed of switches well known in the computer art for applying a read control signal at the read output circuit 222 of the particular plane select driver which is receiving a control signal from the Y gate and decoding circuit 406. The read control signal is a full current selection signal which flows through one of the diodes 215 in the plane corresponding to the energized plane select driver, through one of the column select drivers 208 to a negative source of potential represented by the symbol –V2.

The column select drivers 208 comprise switches which are well known in the computer art for coupling the input circuits thereof to the –V2 source of potential in response to a control signal received from the X gate and decoding circuit 408. The X gate and decoding circuit 408 applies a control signal to only one of the column select drivers 408 and thereby allows the read current to flow through only one column of cores in the selected plane of the memory. The read current causes the signals contained in the selected column, which is a memory location, to be read out and signals corresponding thereto applied on the sense conductors 220–0 through 220–11. The sense amplifiers 204 amplify the signals for storage in the information register 300 during the strobe signal formed at the S output circuit of the memory timing 648 as described more fully hereinbelow.

It is well known that such magnetic cores as the ones described are destructive. That is the storage content of the cores is erased during a read operation and, therefore, if the information is not to be lost it must be written back. To this end, the write control signal is formed at the W output circuit immediately following the read signals so that the signals read out, or new signals may be written back into the cores.

The present invention takes advantage of the write cycle to cause a shift of the former content of a memory location as described more in detail hereinbelow.

However, it should be noted at this point that the write signal at the W output circuit of the memory timing unit 648 causes the same energized plane select driver to apply a write control signal on the write line 223 thereof. The write control signal is a 1/2 current selection signal which is combined with another 1/2 current selection signal to write in the cores.

The write control signal flows via one of the diodes 216 of the selected plane through the same column of cores and through the same energized column-select driver to the –V2 source of potential.

The other 1/2 current-select signal is formed by the information driver and inverter circuits 202. The information driver and inverter circuits are composed of switches and amplifiers which apply signals, corresponding to the input signals thereto from the mode switches 700, and apply signals to the write lines. The signals on the write lines are 1/2 current selection signals and cause bits corresponding to the signal applied at their input circuits to be written into the column of the plane selected by the drivers 206 and 208.

The information driver and inverter circuits 202 actually store a signal corresponding to the complement of what is stored in the information register 300. Therefore, the complement of what is stored in the information register 300 is applied to the information driver and inverter circuits by the mode switches 700 so that the proper bits are written into the cores of the memory. More details of similar magnetic core memories are shown and described in Chapter 8 of the book entitled "Digital Computer Components and Circuits" by R. K. Richards and published by D. Van Nostrand Company, Inc. in 1958.

Refer now to the station control units 100 as shown in FIG. 1. A pair of electrical current carrying conductors 11 are connected between each of the station control units 100 and the corresponding typewriter station. The conductors are referenced by the symbols 11–0 through 11–7 corresponding to the typewriter control units 100–0 through 100–7 and the letters *a* and *b* are affixed to distinguish one conductor from the other. Normally the station control units 100 connect the lines **11–0–*b* through 11–7–*b* to ground potential and the typewriter stations 10 connect the conductors 11–0–*b* through 11–7–*b* directly to the conductors 11–0–*a* through 11–7–*a***, respectively.

When a typewriter station 10 provides signals to the station control units 100, it does so by connecting and disconnecting the conductors **11–*b* and 11–*a* according to the coded signals being transferred to the corresponding control unit. Similarly, the station control units 100 send digital signals to the typewriter stations 10 by connecting and disconnecting the line 11–*b*** from ground potential according to the coded signals being sent to the corresponding typewriter station.

Each of the station control units 100 has an input circuit connected to a separate one of the output circuits of the S decoding circuit 12. The station control units 100–0 through 100–7 are connected to the output circuits S=0 through S=7, respectively, of the S decoding circuit 12. The conductors **11–0–*a* through 11–7–*a* are connected directly through the corresponding station control units to the selection circuit 500 (see FIG. 8). Additionally, each of the station control units 100 has input circuits connected to the output circuits RCTS, SCTS, M=02 and CCP of the control unit 600, and in addition has input circuits connected to the output circuits BBF, B8F, and B8F′ of the information register 300**.

Figure 8:
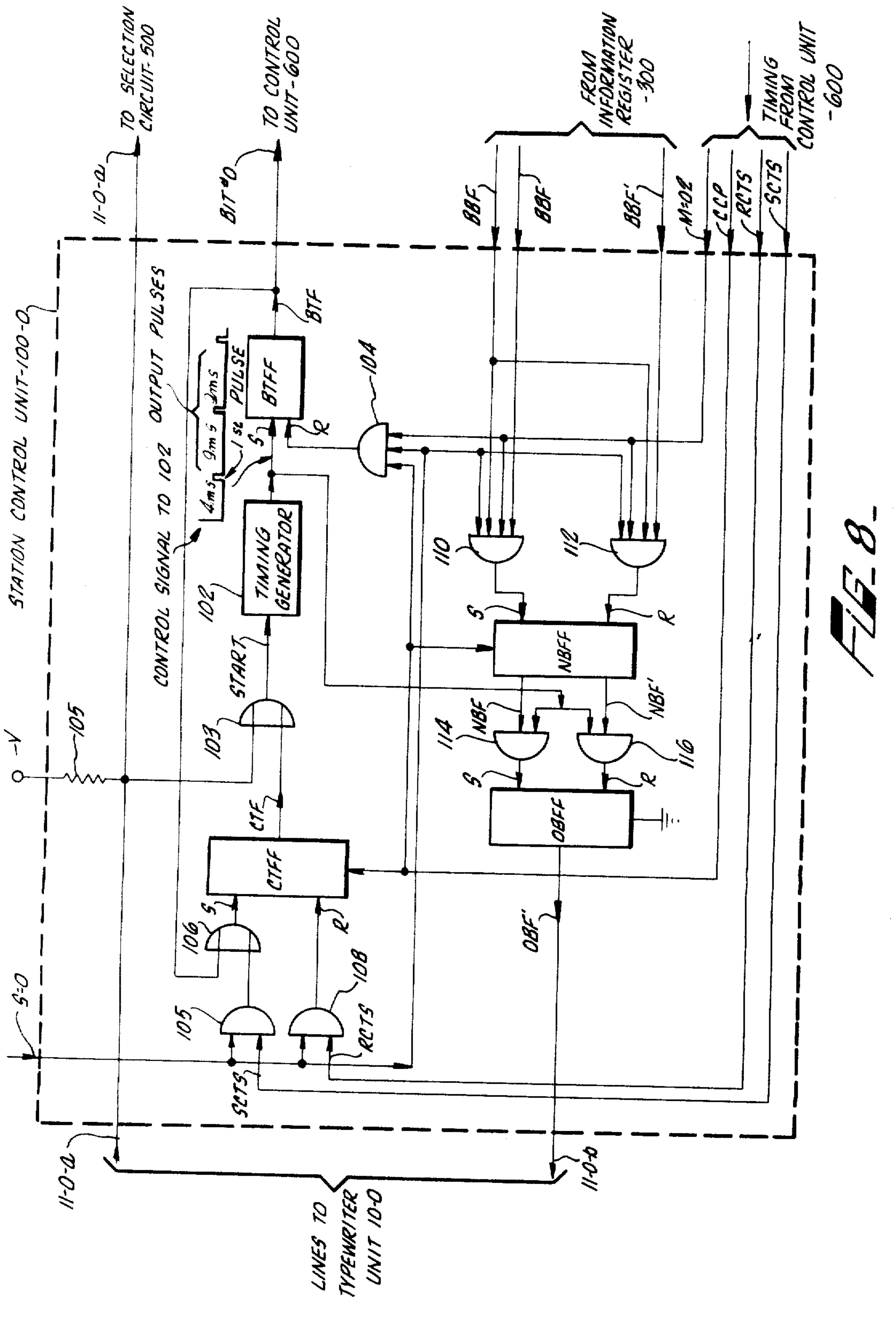
FIG. 8 is a block and schematic diagram showing a portion of the details of the station control units of FIG. 1.

Refer now to the details of the station control units. FIG. 8 shows the details of the station control unit 100–0. Although only the details of station control unit 100–0 are shown in FIG. 8, it should be noted that each of the other station control units in FIG. 1 are identical to the station control unit 100–0, except as noted in the following description.

Referring specifically to FIG. 8, included in station control unit 100–0 is a timing generator 102 and four flip-flops referenced by the symbols BTFF, NBFF, OBFF and CTFF.

The timing generator 102 is arranged to form an output pulse in response to a control signal formed at the output circuit of an OR gate 103. The timing generator 102 is characterized whereby an output control pulse is formed at the output circuit thereof after a four millisecond delay following the control pulse applied at its input circuit. The timing generator also forms a series of control pulses, after the first output pulse, every nine milliseconds under control of a control signal continuously applied thereto by the gate 103. Nine milliseconds is the time interval between the signal bits of a character formed by the typewriter station 10 and also equal to the time duration between the signal bits of a character being sent from the information register 300 to one of the typewriter stations 10.

The OR gate 103 has one input circuit connected to the conductor **11–0–*a* and a second input circuit connected to an output circuit CTF of the CTFF flip-flop. The conductor 11–0–*a* is connected to the –V source of potential by means of a resistor 105. The OBFF flip-flop has its OBF′ output circuit connected to the conductor 11–0–*b*. The OBFF flip-flop is normally in a true state wherein ground potential is applied to the OBF′ output circuit. This causes current to flow to the –V source of potential via the conductor 11–0–*b*, the corresponding typewriter station, the conductor 11–0–*a*, and the resistor 105. The OBFF flip-flop is always set into a false state just prior to the time a series of bits, representative of a character, are sent to the corresponding typewriter station. This causes the OBFF flip-flop to apply a negative potential at the output circuit OBF′ equal to that of the negative source potential –V and cause the current to stop flowing through the conductors 11–0–*b* and 11–0–*a*. The OR gate 103 is a conventional gating circuit which is responsive to the lack of current in the conductor 11–0–*a* for applying a control signal to the timing generator 102. Similarly, the typewriter station signals the beginning of a series of signal bits representative of an inquiry character by disconnecting the conductor 11–0–*b* from the conductor 11–0–*a*. This causes current to stop flowing in the conductor 11–0–*a* and the OR gate 103 to apply a control signal to the timing generator 102. Thus, in either case the timing generator 102** commences the formation of control pulses which aid in the transfer of serial bits of information as described more fully hereinbelow.

The output circuit of the timing generator 102 is connected to the set input circuit of the BTFF flip-flop. Whenever the timing generator 102 forms an output pulse the BTFF flip-flop is set into a true state wherein a control signal is formed at the BTF output circuit. The BTF output circuit is connected to the output circuit BIT #0 and to the set input circuit the CTFF flip-flop through an OR gate 106.

The reset input circuit of the BTFF flip-flop is connected to an AND gate 104 having input circuits connected to the output circuits M=02 (see FIG. 6), S=0, and CCP (see FIG. 6). The AND gate 104 causes the BTFF flip-flop to be reset into a false state each time it is set into a true state by the timing generator 102.

Each of the station control units 100 has a gate similar to 104. However, the gates corresponding to 104 in the station control units 100–1 through 100–7 have their input circuits connected to the output circuits S=1 through S=7, respectively, of the S decoding circuit 12, as opposed to the S=0 output circuit as station control unit 100–0.

The CTFF flip-flop is connected to the CCP output circuit of the clock generator 623 (see FIG. 6) causing the flip-flop to be set and reset in synchronism with clock pulses. The OR gate 106 has an input circuit connected to an AND gate 105. The AND gate 105 has input circuits connected to the output circuits S=0 and SCTS (see FIG. 6). The reset input circuit of the CTFF flip-flop is connected to an AND gate 108 having input circuits connected to the output circuits S=0 and RCTS (see FIG. 6).

The NBFF flip-flop also has an input circuit connected to the CCP output circuit of the clock generator 623 causing the flip-flop to be set and reset in synchronism with clock pulses. The input circuit for setting the NBFF flip-flop into true and false states, respectively, are connected to AND gates 110 and 112, respectively. The AND gate 110 has input circuits connected to the output circuits S=0, BBF, M=02, and B8F. The AND gate 112 has its input circuits connected to the same output circuits as gate 110 except that it has an input circuit connected to the B8F′ output circuit rather than the B8F output circuit.

The gates 110 and 112 cause the NBFF flip-flop to be set into true and false states representative of the bits of a character being sent from the magnetic core memory 201 to the corresponding typewriter station. The NBF output circuit, which receives a control signal when the NBFF flip-flop is in a true state is connected through an AND gate 114 to the set input of the OBFF flip-flop. Similarly, the NBF′ output circuit, which is the complementary output to the NBF output circuit is connected through an AND gate 116 to the reset input of the OBFF flip-flop. The AND gates 114 and 116 also have input circuits connected to the output circuits of the timing generator 102. The OBFF flip-flop is arranged so that it in effect follows the state of the NBFF flip-flop. However, the gates 114 and 116 cause the OBFF flip-flop to change states only in synchronizm with control pulses from the timing generator 102.

TYPEWRITER STATION TO MEMORY MEANS SERIAL BY BIT INPUT MODE

Refer now to FIGS. 9A and 9B and consider the details of the circuitry of the inquiry system required for receiving and storing the serial bits of a character of an inquiry message into the magnetic core memory 201. FIG. 9 is a sketch illustrating the manner in which FIGS. 9A and 9B are joined together. In order to simplify the reference thereto, FIGS. 9A and 9B are hereinafter referred to as FIG. 9. FIG. 9 is a block diagram partly in schematic diagram form and partly in pictorial form showing the details of the information register 300, the selection circuit 500, and the OR gate 702, along with the associated sense amplifiers 204, information driver and inverter circuits 202, and the magnetic core memory 201 for operation during the typewriter station to memory means serial by bit input mode.

Similar to the corresponding general block diagram of FIG. 2, the magnetic core memory 201 is represented by a rectangular block and is divided up into columns and rows. The columns represent the successive content of the input/output memory location of one section of the magnetic core memory 201. Thus, FIG. 9 should be considered assuming that the input/output location of one of the sections of the magnetic core memory 201 is being addressed by the column select drivers 208 and plane select drivers 206 shown in detail in FIG. 7.

In contrast to FIG. 2, which shows only a simplified block diagram of the typewriter station to memory means serial by bit input mode arrangement, FIG. 9 shows the details of an actual embodiment of the invention. Accordingly, the magnetic core memory 201 is shown with its full complement of twelve memory cells (or rows) referenced by the symbols #0 through #11. The write conductors 218–0 through 218–11 and the sense conductors 220–0 through 220–11 are shown connected to the magnetic core memory 201. The sense amplifiers 204 are shown with the input circuits connected to the sense conductors 220–0 through 220–11 and output circuits connected to gating circuits 302–0 through 302–5 and 303–6 through 303–11 of the information register 300. The gating circuits 302–0 through 302–5 and 303–6 through 303–11 are the gating required for controlling the state into which the flip-flops of the information register 300 are set.

Refer now in particular to the gating circuit 302–0 for controlling the state of the DBFF flip-flop. The gating circuit 302–0 includes two OR gating circuits 304 and 306 which apply control signals to set (S) and reset (R) input circuits of the DBFF flip-flop. The OR gate 304 has two input circuits, one of which is connected to an AND gate 312, the other being connected to the output of a gate 320 shown and described in connection with FIG. 11. Similarly, the OR gate 306 has two input circuits, one of which is connected to the D,B ◁ —0 output circuit of the control unit 600 and the other of which is connected to an output circuit of the gate 320 shown and described in connection with FIG. 11. The AND gate 312 has three input circuits, one of which is connected to the output circuit of the sense amplifier 204–0 and the other two being connected to the output circuit of an inverter circuit 660 and the S output circuit, both of which are a part of the control unit 600.

The D,B ◁ —0 output circuit of the control unit 600 always causes the DBFF flip-flop to be reset into a zero state preceding the time a memory location is read out through the sense amplifiers 204 for storage in the flip-flop and the gates 312 and 304 cause a signal corresponding to theo utput circuit of the sense amplifier 204–0 to be stored in the DBFF flip-flop in response to the coincidence of control signals from the inverter circuit 660 and the S output circuit.

The gating circuit 302–1 through 302–5 are identical to the gating circuit 302–0 in circuitry and operation except that they have input circuits connected in the same manner to the output circuits of the sense amplifiers 204–1 through 204–5, respectively, rather than the sense amplifier 204–0.

The gating circuit 303–6 has an OR gating circuit 310 and an AND gating circuit 314 for applying control signals to the reset (R) and set (S) input circuits of the BBFF flip-flop for controlling the state into which the flip-flop is set. The AND gate 314 has two input circuits, one of which is connected to the S output circuit of the memory timing generator 649 of the control unit 600, and the other of which is connected to the output circuit of the sense amplifier 204–6. The OR gate 310 has two input circuits, one of which is connected to the D,B ◁ —0 output circuit of the control unit 600 and the other of which is connected to an AND gate 669 shown and described with reference to FIG. 11. The gating circuits 303–7 through 303–11 are identical to the gate 303–6, except that they control the state into which the flip-flops BAFF and B8FF through B1FF are set, as opposed to the BBFF flip-flop, and have input circuits connected to the sense amplifiers 204–7 through 204–11, as opposed to the sense amplifier 204–6.

In summary, a control signal at the D,B ◁ —0 output circuit causes the gates 302–0 through 302–5 and 303–6 through 303–11 to reset each of the flip-flops of the information register 300 into a false state. A control signal at the S output circuit of the control unit 600 always causes the gates 303–6 through 303–11 to set the BBFF, BAFF and B8FF through B1FF flip-flops into a state corresponding to the output signal of the sense amplifiers 204–6 through 204–11. A control signal at the S output circuit of the control unit 600 in coincidence with a control signal from the inverter circuit 660 causes the gating circuits 302–0 through 302–5 to set the flip-flops DBFF, DAFF, and D8FF through D1FF into states corresponding to the output signals of the sense amplifiers 204–0 through 204–5.

Refer now to the gating circuits of the control unit 600 shown within dash lines in FIG. 9. The inverter circuit 660 is connected to an AND gate 658. The AND gate 658 has input circuits connected to the output circuits M=05 and P=04 of the control unit 600 (see FIG. 6). The inverter circuit 660 is a conventional signal inverting circuit which applies a control signal to the MCWS output circuit thereof whenever the M signal generator 621 and the P signal generator 620 are not in states five and four, respectively, The D,B ◁ —0 output circuit is connected to an OR gate 654 having input circuits connected to an AND gating circuit 656 and a gating circuit 655 shown and described with reference to FIG. 11. The AND gating circuit 656 has input circuits connected to the output circuits M=02, and CCP (see FIG. 6).

Refer now to the details of the selection circuit 500 shown in FIG. 9. The selection circuit 500 has signal inverter circuit 506 connected to the output circuit SLINS′. The inverter circuit 506 is connected to an OR gate 504 having eight input circuits connected to eight AND gates 502–0 through 502–7. The AND gates 502–0 through 502–7 are associated with the station control units 100–0 through 100–7, respectively and have input circuits connected to the BIT #0 through BIT #7 output circuits. The AND gates 502–0 through 502–7 also have input circuits connected to the output circuits S=0 through S=7, respectively. The inverter circuit 506 is a conventional signal inverter circuit which applies a control signal to the mode switches 700 in the absence of a control signal at the input circuit thereof.

The AND gates 502–0 through 502–7, the OR gate 504 and the inverter circuit 506 cooperate to form a control signal at the output circuit SLINS′ whenever the S decoding circuit 12 is not forming a control signal at an output circuit corresponding to a station control unit 100 which is forming a control signal at its BIT output circuit. For example, assuming that the S decoding circuit 12 is forming a control signal at the S=0 output circuit but the only station control unit which is not forming a control signal at its BIT output circuit is station control unit 100–0 none of the AND gates 502 will form a control signal, hence the OR gate 504 will not apply a control signal to the inverter circuit 506, causing the inverter circuit 506 to form a control signal at the SLINS′ output circuit. However, assuming that the S decoding circuit 12 forms a control signal at its S=0 output circuit in coincidence with a control signal at the BIT #0 output circuit of station control unit 100–0, the AND gate 502–0 and hence the OR gate 504 will apply a control signal to the inverter 506 causing the inverter circuit 506 to remove the control signal at the SLINS′ output circuit. Thus, the selection circuit 500 forms a control signal at the SLINS′ output circuit which represents the complement of the bit of an inquiry message being formed by the typewriter station which corresponds to the state of the S counter 14.

Refer now to the details of the mode switches 700 as shown in FIG. 9. The mode switches 700 include twelve OR gates 702 which are referenced by the numbers 702–0 through 702–11. The OR gates 702–0 through 702–11 are connected to information driver and inverter circuits 202–0 through 202–11, respectively. The OR gates 702–0 through 702–11 have input circuits connected to the output circuits of AND gating circuits 704–0 through 704–11 and an output circuit of AND gates shown and described with reference to FIG. 11.

The AND gates 704–0 through 704–11 each has an input circuit connected to the output circuit M=02 of the control unit 600 (see FIG. 6). In addition, the gates 704–0 through 704–5 have input circuits connected to the output circuits B1F′, DBF′, DAF′, D8F′, D4F′ and D2F′. The AND gate 704–7 has another input connected to the D1F′ output circuit and the AND gates 704–10 and 704–11 have input circuits connected to the output circuits B4F′ and B2F′.

It should be noted that since the information driver and inverter circuits 202 invert signals, they apply the complement of the signal applied at their input circuits. For example, if a control signal is applied to the input circuit of an information driver and inverter circuit, the control signal represents a one bit. However, a zero bit will be written in the corresponding cell. Accordingly, the signals must be inverted when applied to the AND gate 704. To this end, connections are made to the primed outputs of the flip-flops of the register 300, rather than the unprimed output circuits.

With this circuit arrangement whenever the contents of the magnetic core memory 201 is read out and stored in the flip-flops of the information register 300, the same information bits stored in flip-flops DBFF, DAFF, D8FF, D4FF, D2FF, D1FF, B4FF, B2FF and B1FF will be rewritten into the memory cells of the same memory location from which the signals were read but displaced to the memory cells corresponding to which the output circuits of the flip-flops are coupled.

The flip-flops BBFF, BAFF, and B8FF are used for special control functions during the typewriter station to memory means serial by bit input mode. For example, the AND gate 704–8 has input circuits connected to the BBF and BAF′ output circuits. The BBFF flip-flop always stores a zero bit after a memory access, therefore, the AND gate 704–9 does not form a control signal causing the information driver and inverter circuit 704–8 to write a one bit during each memory cycle during the typewriter station to memory means serial by bit input mode of operation.

The gate 704–9 is connected to the output circuit SLINS′ and to the BBF′ and the B8F output circuits. During the time the first bit of an inquiry character is applied at the SLINS′ output circuit, the BBFF and the B8FF flip-flops are storing zero bits (having been read out of the input/output memory location of one of the sections of the magnetic core memory 201). Thus, a control signal is not applied at the B8F output circuit connected to the AND gate 704–9 causing the AND gate 704–0 not to apply a control signal to the information driver and inverter circuit 202–9. Thus, the information driver and inverter circuit 202–9 writes a one bit into the memory cell #9.

After the first memory access memory cell #8 stores a one bit. Also memory cell #6, hence flip-flop BBFF always stores a zero bit. Therefore, the AND gate 704–9 receives a control signal from the B8F and BBF′ output circuits subsequent to the first memory access. This causes signals corresponding to those formed at the SLINS′ output circuit to be applied to the information driver and inverter circuit 202–9, causing the information driver and inverter circuit 202–9 to write signals corresponding to the bits of the inquiry character being provided by a typewriter station.

To be explained in the subsequent description, the one bit which is written into memory cell #9 is a start bit which is shifted around through the memory cells of the input/output storage location until the start bit is stored into the D1FF flip-flop. Up to the time that the start bit is stored in the D1FF flip-flop, a zero bit is always stored in the D1FF flip-flop. Therefore, when the start bit, which is a one bit, is stored in the D1FF flip-flop, the D1FF flip-flop is in a unique state which indicates that a complete inquiry character has been accumulated from one of the typewriter stations and that the typewriter station to memory means serial by bit input mode, for the particular typewriter station 10 terminates.

The function of the BBFF flip-flop is quite important. Prior to the typewriter station to memory means serial by bit input mode of operation, a zero bit is written into memory cell #6. Therefore, after each memory access the flip-flop BBFF always stores a zero bit. Before a memory means to typewriter station serial by bit output mode of operation a one bit is written into memory cell #6. Therefore, after a memory access the mode of operation can be determined by noting the state of the BBFF flip-flop. The gate 704–6 is merely provided to cause the bit, read out of the memory cell #6, to be rewritten back during the subsequent write cycle.

Consider now the operation of the inquiry system during a typewriter station to memory means serial by bit input mode of operation. During the subsequent description, reference should be made to the flow diagram shown in FIG. 12 which illustrates the sequence of operation of the inquiry system both during a typewriter station to memory means serial by bit input mode of operation and a memory means to typewriter station serial by bit output mode of operation. The flow diagram shown in FIG. 12 has two groups of boxes identified by the states zero and two of the M signal generator 621 at the top of each group. A control signal at the output circuit indicated in the right-hand column logically anded with a control signal at the output circuit of the M signal generator 621 indicated at the top indicates the condition under which a control signal is formed at the output circuit indicated in the left-hand column of the flow. For example, a control signal at the output circuits ABTS or ICTS and M=00 causes a control signal at the CCP output circuit 622 (see FIG. 6).

At the top of the left-hand column of each flow the operation to be performed by the memory system is indicated. For example, during state zero of the M signal generator no memory cycle is to take place. In those instances where no symbols are shown in the right-hand column, the only signal necessary to form the control signal at the output circuit shown in the left-hand column is the signal from the M signal generator 621 indicated at the top of the flow.

Consider now the operation of the inquiry system making reference to FIGS. 1, 2, 6, 8 and 12. Assume initially that the M signal generator 621 and the P signal generator 620 (see FIG. 6) are both set into state zero and that no inquiry characters are being typed at the typewriter stations 10. With reference to the flow diagram of FIG. 12, it will be noted that no memory cycle is to take place and since no bits are being formed by the typewriter stations for storage in the magnetic core memory, no clock pulses are formed and the S counter 14 is not counted.

Assume now that an operator types a character at the typewriter station 10–0. With reference to the flow diagram of FIG. 12, a clock pulse signal is to be formed, the S counter 14 is to be counted until the state thereof corresponds to typewriter station 0, and the M signal generator 621 is to be set into state two. To this end, the typewriter station 10–0 first forms a start bit signal. The other bits of the character will be described hereinafter as it need not be necessary for an understanding of the operation at this point. A start bit signal is always a zero bit and is formed by breaking the connection between the conductors 11–0–*a* and 11–0–*b*. This causes the OR gate 103 (see FIG. 8) to apply a control signal to the timing generator 102 causing the timing generator 102 to apply a control pulse to the BTFF flip-flop, after a 4 millisecond delay, setting it into a one state. This causes a control signal to be formed at the BIT #0 output circuit.

The control signal at BIT #0 causes the OR gate 602 of the control unit 600 (see FIG. 1) to form a control signal at the ABTS output circuit. Also assuming that the S counter 14 is not in state zero, the gates 610 through 617 and 603 do not form a control signal at the SBTS output circuit. This causes the inverter circuit 664 and the gate 662 to apply a control signal to the S+1 input circuit of the S counter 14 causing it to count in response to clock pulses.

Referring to FIG. 6, the control signal at the output circuits M=00 and ABTS cause the gates 645 and 622 to apply a control signal to the clock generator 623, causing clock pulses to be formed. The BTFF flip-flop remains in a one state causing a control signal to be maintained at BIT #0 and hence at the ABTS. Thus, the clock generator 623 continues applying clock pulses at the CCP output circuit causing the S counter 14 to count from one state to the next until the S counter 14 is in state zero. When the S counter 14 is in state zero a control signal is formed at the S=0 output circuit causing the gates 610 and 603 to apply a control signal at the SBTS output circuit and cause the inverter circuit 664 and AND gate 662 to remove the control signal from the S+1 input circuit of the S counter 14. This causes the S counter 14 to stop counting.

With reference to the flow diagram of FIG. 12, it will be noted that a control signal at the SBTS output circuit indicates that the S counter 14 is in a state corresponding to the typewriter station forming a bit of an inquiry message, and that the M signal generator 621 must be set into state two so that the bit from typewriter station may be stored in the magnetic core memory 201. To this end, the gate 632 (see FIG. 6) applies a control signal to the M◁—02 set line of the M signal generator 621. This causes the M signal generator 621 to be set into state two at the occurrence of the next clock pulse after the one which set the S counter 14 into a state corresponding to the typewriter station 10–0.

Referring again to the flow diagram of FIG. 12, it will be noted that during state two of the M signal generator 621 the input/output memory location of one of the sections of the magnetic core memory is to be accessed, a clock pulse is to be formed, the BTFF flip-flop is to be reset to a zero state, and following the memory access, the data and buffer sections of the information register 300 are to be reset to zero.

Refer now to FIG. 6. The clock pulse which set the M signal generator 621 into state two also causes the delay circuit 650 to apply a pulse at the T output circuit thereof after the M signal generator 621 is in state two. Therefore, when the pulse is formed at the T output circuit the inverter circuit 652 is applying a control signal to the gate 651 allowing the pulse to be applied to the timing generator 649. This causes the timing generator 649 to form memory read, write and strobe signals at the W, R and S output circuits.

Refer now to FIG. 1. The control signal at the M=02 output circuit causes the gate and S decoding circuits 10 and the X gate and decoding circuit 408 to energize the plane select drivers 206 and the column select drivers 208 so as to cause the input/output memory location of section 0 to be addressed. This causes the content of the input/output memory location of section 0 to be read out and applied to the sense amplifiers 204 and stored in the information register 300.

Refer again to FIG. 9 and consider how this is accomplished in detail. A strobe signal at the S output circuit in coincidence with the read signal formed at the R output circuit causes the gates 302–0 to 302–5 and 303–6 through 303–11 to set the flip-flops of the information register 300 into states corresponding to the signals formed by the corresponding sense amplifiers. Initially, the input/output memory location contains all 0 bits therefore, the information register 300 now stores all 0 bits.

The M signal generator 621 is still in state two forming a control signal at the M=02 output circuit. Therefore, the AND gates 704 are partially activated. The flip-flops of the information register are all storing 0 bits, the gates 704–0 through 704–7 and 704–10 and 104–11 cause 0 bits to be written into the addressed memory location at the occurrence of the following write control signal at the W output circuit. Subsequently, the timing generator 649 forms the write control signal at the W output circuit causing the content of the information register 300 (all zeros) to be written back into the input/output memory location. However, it should be noted that since the BBFF and B8FF flip-flops are storing 0 bits and 704–9 cause 1 bits to be written into memory cells #8 and #9. Thus, although the start bit is a 0 bit, a 1 bit is written into memory cell #9.

The M signal generator 621 (FIG. 6) remains in state two and the gate 622 (see FIG. 6) causes the clock generator 623 to form another clock pulse. This is the first clock pulse occurring during state two of the M signal generator 621. The clock pulse causes the gates 656 and 654 of the control unit 600 (see FIG. 9) to apply a control signal to the gates 302–1 through 302–5 and 303–6 through 303–11 causing all of the flip-flops of the information register 300 to be reset into a zero state. However, since the flip-flops were already in a zero state, they do not change states.

Refer to FIGS. 6 and 8. The BBFF and D1FF flip-flops are both storing a 0 bit prior to the same clock pulse which cleared the information register 300. Also control signals are applied at the M=02 and S=0 output circuits. Therefore, the same clock pulse which cleared the flip-flops of the information register 300 causes the gates 104, 627 and 624 to reset the BTFF flip-flop to a zero state and reset the M signal generator 621 to a zero state. Thus, the control signals are removed from the BIT #0 and M=00 output circuits. Up to this point the start bit has been stored in the memory cell #9 of the addressed memory location.

Since there is a 9 millisecond delay between bits of a character formed by the typewriter stations, the inquiry system may process and store bits from other typewriter stations while waiting for the next bit from the same typewriter station. To this end, the inverter circuit 664 and gate 602 of the control unit 600 (see FIG. 1) are arranged for causing the S counter 14 to start counting whenever a control signal is formed at the BIT output circuit of one of the station control units 100. If one of the other typewriter stations 10 forms a bit of an inquiry message, the S counter 14 stops counting and the bit is stored similar to that described with reference to typewrtier station 10–0. However, since the S counter 14 stops at a state corresponding to the particular typewriter station forming the bit, the section of the magnetic core memory 201 corresponding to that particular typewriter station 10 will be addressed during the read and write operation rather than section 0 as described with reference to type writer station 10–0.

Assume now that 9 milliseconds has elapsed and the timing generator 102 of the station control 100–0 forms the second pulse indicating that the second bit of the character is being formed by typewriter station 10–0. It should be kept in mind that the second bit of the character formed by a typewriter station is actually the first of six information bits (see FIG. 9C). The timing generator 102 causes the BTFF flip-flop to be set into a true state causing a control signal at the BIT #0 output circuit and the S counter 14 is counted into state zero as described hereinabove. Also the M signal generator 621 (see FIG. 6) is set into state two. During the read operation, the content of the input/output memory location of section 0 of the magnetic core memory 201 is read out and stored in the information register 300 by the gate circuits 302–0 through 302–5 and 303–6 through 303–11, exactly as described hereinabove.

Assume that the typewriter station 10 is forming a character including the serial binary bits 01010101110. To be explained in detail only the first ten bits (starting from the left) of the bits formed by the typewriter station are stored. The start bit (the left most bit) has already been received and the first information bit (next to the left most bit) is being formed by the typewriter station 10–0. The selection circuit 500 (see FIG. 9) and specifically the circuits 502–0, 504 and 506 apply a signal to the output circuit SLINS′ corresponding to the complement of the bit. Since the bit is a binary bit 1, no control signal is applied to the output circuit SLINS′, thereby causing the gate 704–9, the gate 702–9 and the information driver and inverter circuit 202–9 to write a one bit into memory cell #9 of the input/output memory location during the subsequent write operation.

Referring specifically to gate 704–9, it should be noted that the 1 bit, in memory cell #8, has now been read out and stored into the B8FF flip-flop. Also a zero bit has been read out of memory cell #6 and stored in the BBFF flip-flop. Therefore the AND gate 704–9 received control signals which enable the gate 704–9 to form a control signal at its output circuit corresponding to the signal formed at the output circuit SLINS′. This is in contrast to the operation when the start bit was received from the typewriter station and the B8FF flip-flop was storing a 0 bit causing the gate 704–9 to cause a 1 bit to be written into memory cell #9 even though the start bit is a 0 bit. Thus, during the write operation, the start bit which was read out of memory cell #9 and stored in the B4FF flip-flop is written back into memory cell #10 via the gate 704–10 and the first information bit of the character is correctly written into memory cell #9. This operation continues, and each new bit of the character is stored in memory cell #9. Each time another bit of the character is received, the bits stored in the input/output memory location are shifted from memory cell #9 to the following memory cells in the order shown: #10, #11, #0, #1, #2, #4, #5 and #7. An asterisk is shown with the start bit shown in the magnetic core memory 201 in FIG. 9 in order to illustrate the successive positions of the information stored in the magnetic core memory 201.

The typewriter station to memory means serial by bit input mode of operation is terminated as follows. After nine of the ten bits from the typewriter station are stored in memory the start bit is stored in memory cell #5 as indicated by the asterisks. As the tenth bit is received the start bit is read out of cell #5 and stored in the D1FF flip-flop. Up to the time that the start bit is read out of memory cell #5, the only bit stored in the D1FF flip-flop during a write operation is a 0 bit. Since the start bit is a 1 bit in the memory, the D1FF flip-flop stores a 1 bit following the read operation after the start bit is written in memory cell #5.

Referring to the flow diagram of FIG. 12, it will be noted that when the BBFF flip-flop is storing a 0 bit and the D1FF flip-flop is storing a 1 bit, the M signal generator 621 is set into state 11. To this end, the gate 634 (see FIG. 6) applies a control signal to the M◁—11 set line causing the M signal generator 621 to be set into state eleven at the occurrence of the next clock pulse. The bits stored in the information register 300 are written back into the input/output memory location as illustrated in the last column of FIG. 9. Also, the tenth bit of the character from the typewriter station (a 1 bit) is stored in the memory cell #8.

It is important to note that at the end of the typewriter station to memory means serial by bit input mode of operation, the six information bits of the inquiry character are written into memory cells #0 through #5 of the input/output memory location. During state eleven of the M signal generator 621 the information bits contained in memory cells #0 through #5 are read out of the input/output memory location of section 0 and stored into one of the memory locations of section 0 of the magnetic core memory 201. This operation is performed under the control of the M signal generator 621. The details of the timing involved and the actual steps of operation are not described as such and are not necessary for a complete understanding of the present invention. However, it will be noted that conventional gating and timing (not shown) are provided in the signal generator **621*a* which applies a control signal to the clock generator 623 through the gate 620 and to the M◁—00 set line of the M signal generator 621, through the gate 624. This signal is formed after the information bits have been read out of the input/output memory location and written into the appropriate memory location. The control signal causes the M signal generator 621 to be reset into state zero. For purposes of explanation, a switch is shown in 621*a* connected to a source of potential for forming the control signal. The M signal generator 621 remains in state zero until another signal is formed at a BIT output circuit of one of the station control units 100 indicating that another inquiry bit is to be stored in the magnetic core memory 201**.

When an operator finishes composing an inquiry message at a typewriter station he types a unique character referred to herein as a "group mark" character. The "group mark" character has a unique combination of binary bits in the six information bits of the character which identify it as the group mark character. When the six information bits of the group mark character are read out of the memory cells of the input/output memory location and stored into the data section 300–D of the information register 300, the decorder 628 (FIG. 6) is responsive thereto for applying a control signal at the D=GM output circuit. This causes the signal generator **621*a* to apply a control signal to the P◁—05 set line of the P signal generator 622 via the gate 653 and to the IMRS line to the computer system 20, and a control signal to the M◁—00 set line of the M signal generator 621. This causes the P and M signal generators to be set into states five and zero, respectively, and causes the computer system to be signalled that the section specified by the state of the S counter 14 has a complete inquiry message to be processed. For purposes of illustration a switch is shown in 621*a* for applying the control signal to the gate 653**.

MEMORY MEANS TO TYPEWRITER STATION SERIAL BY BIT OUTPUT MODE

After an inquiry message has been sent to the computer system 20 and in response thereto a reply message is sent back by the computer system 20 and stored in a section of the magnetic core memory 201, a memory means to typewriter station serial by bit output mode of operation takes place.

Refer to FIG. 10 which shows the details of the mode switches 700, the information driver and inverter circuits 202 and the magnetic core memory 201 for causing the inquiry system to operate in the memory means to typewriter station serial by bit output mode. FIG. 10 is quite similar to FIG. 9 except that the selection circuit 500 is not shown and gate 704–9′ of the mode switches 700 replaces the gate 704–9 of the mode switches 700 which is shown in FIG. 9. Also the details of the sense amplifiers 204 and the information register 300 and the details of their interconnection are not shown in detail as the details are identical to that shown in FIG. 9. Additionally, the B8FF flip-flop of the information register 300 is shown with its output circuit going to the station control units 100 and the magnetic core memory 201 is arranged in rows and columns for indicating the sequential storage content of the input/output memory location of a section of the memory during the mode of operation under consideration.

Consider now the operation of the inquiry system during a memory means to computer station serial by bit output mode of operation. Prior to this mode of operation, but after a reply message is stored in a section of the magnetic core memory 200, the M signal generator 621 is set into state fifteen wherein a control signal is formed at the M=15 output circuit. The signal generator **621*d* (see FIG. 6) has timing and gating (not shown) which cause the first character of the reply message contained in the section to be transferred to the input/output memory location of that section. The details of the circuits for this operation need not be understood for a complete understanding of the present invention and for this reason are not described in detail. Only one character is stored in the input/output section at a time and along with the character timing bits, start bits and stop bits are stored. The start and stop bits are for controlling the operation of the typewriter stations. The actual use of the two timing bits is not explained herein as the use thereof is not material to the present invention. For purposes of explanation it is assumed that the following is stored in the input/output memory location of section 0: the character bits 101010 stored in memory cells #1 through #5 and #7, a 0 bit (start bit) stored in memory cell #8, two 1 bits (timing bits) stored in memory cells #9 and #10, and two 1 bits (stop bits) stored in memory cells #11 and #0. Also a 1 bit (timing bit) is stored in memory cell #6 to designate that a memory means to typewriter station serial by bit output mode of operation is to take place. These bits are illustrated in the memory cells in the first column shown in FIG. 10. The start bit is identified in memory cell #8** by an asterisk. The subsequent positions of the start bit as the bits of the character are read out of the magnetic core memory are also indicated by an asterisk.

After the reply character, start and stop bits and timing bits are stored in the magnetic core memory as shown in FIG. 10, the signal generator 621*d* applies a control signal to the CTFF flip-flop via the SCTF output of the signal generator 621*d* and the gates 105 and 106 (see FIG. 8), a control signal is applied to the clock generator 623 via the output circuit B and the gate 643 (see FIG. 6) and a control signal is applied to the M 00 set line and a control signal is applied to the M◁—00 set line of the M signal generator 621 via the gate 624 (see FIG. 6). This clock pulse causes the clock generator 623 to form a clock pulse and set the M signal generator 621 into state zero and the clock pulse, in combination with the control signal at the S=0 output circuit, sets the CTFF flip-flop into a one state. The CTFF flip-flop, in turn, applies a control signal through the OR gate 102 to the timing generator 102 causing it to start forming timing pulses. The gating and timing for applying control signals at the B and SCTS output circuits are not shown in detail in FIG. 6. For purposes of illustration, switches are shown in the circuit 621*d* for forming the control signals.

The first timing pulse formed by the timing generator 102 causes the BTFF flip-flop to be set into a true state and form a control signal at the BIT #0 output circuit. Assume that the S counter 14 is in a state corresponding to typewriter station 10–0. From the preceding discussion, it will be understood that the gates 610 and 603 now form a control signal at the SBTS output circuit (see FIG. 1). The control signal at the SBTS output circuit in coincidence with the control signal at the M=00 output circuit causes the gate 632 to set the M signal generator 621 (see FIG. 6) into state two at the occurrence of the next clock pulse.

During state two of the M signal generator 621, the magnetic core memory 201 is addressed causing the content of the input/output storage location of section 0 to be read out, stored in the information register 300 and rewritten into the input/output memory location but displaced one cell from which the information was read and the first bit of the character is sent to the typewriter station 10–0.

To this end, the clock pulse which caused the M signal generator 621 to be set into state two also triggers the delay circuit 650 (see FIG. 6). The delay circuit 650 causes the timing generator 649 to form read, write, strobe control signals at its R, W and S output circuits causing the content of the input/output memory location of the magnetic core memory 621 to be read out, stored in the information register and subsequently written back into the same memory location but shifted one memory cell due to the connection between the flip-flops of the information register and the information driver and inverter circuits 202 by the mode switches 700. The operation is quite similar to that described in connection with the typewriter station to memory means serial by bit input mode of operation and may be understood by reference to this discussion. Following the read operation, the flip-flops of the information register 300 contain the bits shown in the first column in memory 621 shown in FIG. 10. Therefore, the B8FF flip-flop contains the 0 bit start bit causing a control signal at the B8F′ output circuit. Also the timing bit stored in memory cell #6 is stored in the BBFF flip-flop and, since it is a 1 bit, the BBFF flip-flop forms a control signal at its BBF output circuit. Referring to FIG. 8, the control signals at the S=0 output circuit, in combination with the control signals at the M=02, BBF, and B8F′ output circuits, cause the NBFF flip-flop to store a 0 bit at the occurrence of the following clock pulse.

With the NBFF flip-flop storing a 0 bit, a control signal is formed at the NBF′ output circuit and the timing generator 102 forms a control pulse causing the gate 116 to trigger the OBFF flip-flop into a 0 state causing the current to stop flowing in conductor 11–0–*b*. The lack of current in line 11–0–*b* causes the typewriter station 10–0 to be conditioned ready to receive the following bits of the character being read out of the magnetic core memory 201.

Referring back to FIG. 10, it should also be noted that a 1 bit is stored in the BBFF flip-flop causing the gate 704–6 to cause a 1 bit to be written back into memory cell #6.

When the content of the flip-flops of the information register 300 are written back into the input/output memory location of the magnetic core memory 201, the 1 bit stored in the BBFF flip-flop causes a control signal at the BBF output circuit, therefore, the gate 704–9′ causes a 0 bit to be written into memory cell #9. It is important to note that each time information is read out of the magnetic core memory 201 and sent through the corresponding station control unit to a typewriter station, a 0 bit is written into memory cell #9. Thus, as the bits are shifted around in the input/output memory location of the magnetic core memory, the memory location will eventually contain all 0 bits (except for memory cell #6). This indicates that a complete character has been read out of the input/output memory location and sent to the corresponding typewriter station.

Since the contents of the input/output memory location are shifted the memory cell #8 now contains the first information bit of the character being sent to the typewriter station. The next pulse from the signal generator 102 causes the memory to again be addressed and the content of the input/output memory location read out and stored in the flip-flops of the information register 300. Thus, the first information bit is stored in the B8FF flip-flop and sent to the typewriter station 10–0.

Each time the timing generator 102 (see FIG. 8) forms a pulse and causes the BTFF flip-flop to be set into a one state, the S counter 14 is caused to count until it corresponds to typewriter station 0 at which time the M signal generator 621 is set into state two and another memory access takes place. Also, the bit read out of the magnetic core memory and stored in the B8FF flip-flop is sent to the typewriter station 10–0 via the NBFF and OBFF flip-flops of the station control unit 100–0.

During the memory access when the eleventh bit, or second stop bit is read out and stored in the B8FF flip-flop, the flip-flops D1FF through D8FF, DAFF, DBFF, B1FF through B4FF and BAFF are all storing 0 bits. This causes the decoder circuit 630 (see FIG. 6) to form a control signal at the DB=0 output circuit. The combination of the control signal at the DB=0 output circuit and the control signals at the BBF and M=02 output circuits cause the gates 637 and 635 to apply a control signal to the M◁—15 set line of the M signal generator 621. This causes the M signal generator 621 to be set into state fifteen wherein a control signal is formed at the M=15 output circuit again. This in turn causes the signal generator 621 to form timing signals which cause the next character of the reply message to be read out of one of the memory locations of section 0 of the magnetic core memory 201 and stored in the input/output memory location of section 0. The bits of the next reply character are sent to typewriter station 10–0 similar to that just described.

At the end of the reply message M signal generator 621 is again set into state fifteen. However, in contrast to the previous characters a group mark character is read out of section 0 and stored in the information register 300. This causes the decoder 628 (see FIG. 6) to apply a control signal to the signal generator **621*d* signalling it that the end of the reply message has been reached. The signal generator 621*d* forms control signals causing a 0 bit to be stored in memory cell #6 of the input/output memory location ready to receive a bit of an inquiry message from typewriter station 10–0. The gating and timing for this operation is not shown in detail as an understanding thereof is not necessary for a complete understanding of the present invention. Suffice it to say that conventional timing and gating may be employed to store the 0 bit in cell #6** as will be evident to those skilled in the art.

When the group mark character is detected and the control signal formed at the D=GM output circuit the signal generator **621*d* applies a control signal at the RCTS output, rather than the SCTS output circuit causing the CTFF flip-flop (see FIG. 8) to be reset to a zero state in response to the next clock pulse. For purposes of explanation, a switch is shown in the circuit 621*d*** for applying the control signal at the RCTS output circuit.

MEMORY MEANS TO COMPUTER SYSTEM PARALLEL BY BIT OUTPUT MODE

Refer now to FIG. 11 wherein the details of the information register 300 and the mode switches 700 are shown along with the sense amplifiers 204, the information driver and inverter circuits 202, and the magnetic core memory 201 for effecting the computer system to memory means parallel by bit input mode of operation.

Consider first the interconnection between the flip-flops of the information register 300 and the information driver and inverter circuits 202. The mode switches 700 have AND gating circuits 710–0 through 710–11 for coupling the output of the flip-flops of the information register 300 to the OR gates 702–0 through 702–11, described hereinabove with reference to FIGS. 9 and 10. The DBF', DAF', D8F' through D1F' output circuits are coupled to the information driver and inverter circuits 202–6 through 202–11 by the AND gates 710–6 through 710–11, respectively. Similarly, the BBF', BAF' and B8F' through B1F' output circuits are coupled to the information driver and inverter circuits 202–0 through 202–5 by the AND gates 710–0 through 710–5, respectively. The AND gates 710 couple the flip-flops of the information register 300 through the OR gates 702–0 through 702–11 in response to control signals at the output circuit M=05. Thus, it should be noted that two characters read out of the magnetic core memory 201 and stored in the information register 300 will be restored in the magnetic core memory but due to the cross connection between the information register 300 and the information driver and inverter circuits 202, the character stored in the data section 300–D will be stored in the position formally occupied by the character stored in the buffer section 300–B and vice versa.

Consider now the gating for storing the bits read out of the magnetic core memory into the information register 300 and the gates for causing the reply characters provided by the computer system 20 to be stored into the flip-flops of the data section of the information register 300. The gating circuits 302–0 through 302–5 and 303–6 through 303–11 for effecting the storage of information in the flip-flops of the information register 300 during the memory means to computer station parallel by bit output mode of operation are similar to that described hereinabove with reference to FIG. 9. There are three differences. One difference in the gating circuits 302–0 through 302–5 and 303–6 through 303–11 lies in the control for causing the flip-flops of the information register 300 to be cleared or reset to a zero state. The OR gate 654 described with reference to FIG. 9 was shown with an input circuit connected to an AND gate 656. The OR gate 654 also has an input connected to the output circuit of an AND gate 655 as shown in FIG. 11. The AND gate 655 has input circuits connected to the output circuits CCP, M=05 and P=05. The second difference in the gating for the information register 300 lies in the connection of the OR gates 310, for the gating circuit 303–6 through 303–11, to an output circuit B◁—0 of an AND gate 669 in the control unit 600 as shown in FIG 11. The gate 669 has input circuits connected to the output circuits CCP, M=05 and P=04. The gate 669 causes the flip-flops in the buffer section 300–B to be reset to a zero state.

The third difference in the gating for the information register 300 lies in connection of the OR gates 304 and 306 of the gating circuits 302–0 through 302–5 to a gating circuit 320. The gating circuit 320 causes reply characters from the computer system 20 to be stored in the data section 300–D of the information register 300. The details in this connection are described in connection with the computer station to memory means parallel by bit input mode of operation.

Consider now the operation of the inquiry system during a memory means to computer system parallel by bit output mode of operation.

It was pointed out hereinabove that the signal generator **621*a* affects the transfer of inquiry characters from the input/output memory location of a section of the magnetic core memory 201 to the appropriate memory locations in the same section. When the signal generator 621*a* receives a control signal at the D=GM output circuit of the decoder 628 (see FIG. 6) indicating that a group mark signal is being transferred, the signal generator 621*a* applies control signals to the M◁—00 and P◁—05 set lines of the M signal generator 621 and P signal generator 620 causing the generators to be set into states zero and five, respectively. Additionally, the signal generator 621*a* applies a control signal to the IMRS output circuit to the computer system 20 signalling the computer system that a complete inquiry message is ready to be sent to the computer system 20. Subsequently, the computer system 20 forms a control signal at the ICTS output circuit thereof, which, in combination with the signal at the M=00 output circuit, causes the gates 633 and 647 to set the M signal generator 621** into state four. The signal at the ICTS output circuit indicates the computer is ready to receive an inquiry message. The memory means to computer system mode of operation is now entered.

Refer to FIG. 13 which shows a flow diagram illustrating the sequence of operation of the inquiry system during a memory means to computer system parallel by bit output mode of operation. While the M signal generator 621 is in state four, the address of the initial column in the magnetic core memory 201, from which an inquiry character is to be read out for the computer system 20, is read out of the corresponding section of the memory and is stored in the X register 404. Also the S counter 14 is in a state corresponding to the typewriter station which has just provided the complete inquiry message for storage in the magnetic core memory 201, and the state thereof is to be stored in the Y register 402. To this end, the signal generator **621*b*, by gating (not shown), causes the Y register 402 to store signals corresponding to the state of the S counter 14 and also causes an initial address to be stored in the X register 404 in a conventional manner well known in the computer art. The initial address stored in the X register 404 is the address of column 1 and is the first address from which an inquiry character is to be read from the memory 201. Assuming section 0** has the inquiry message, the initial address of the section 0 of the magnetic core memory 201 is now specified by the content of the X and Y registers 404 and 402. The signal generators **621*b* then applies a control signal to the M signal generator 621 via the C output circuit and the gate 624 causing the signal generator to be set into state five. The signal formed at the C output circuit of the signal generator 621*b* also causes the clock generator 623** to form a clock pulse.

Referring again to FIG. 13, it will be noted that with the M and P signal generators 621 and 620 in state five, a character is to be read out of the magnetic core memory 201. The magnetic core memory 201 is to be addressed and the content of the address memory location is to be read out and stored in the information register 300, the X register 404 is to be counted up one state and after the write operation the data and buffer sections of the information register 300 are to be reset to 0. To this end, the clock pulse caused by the signal generator **621*b* causes the timing generator 649 to initiate a read and write operation in the memory as described hereinabove. The Y gate and decoding circuit 406 and the X gate and decoding circuit 408 cause the initial input memory location of section 0 to be addressed and the two characters therein are coupled through the sense amplifiers 204 allowing the strobe signal to cause the gates 302–0 through 302–5 and 303–7 through 303–11 (see FIG. 11) to store the characters in the flip-flops of the information register 300**, in the same manner as described hereinabove with reference to FIG. 9.

With the two characters read out of the addressed memory location and stored in the information register 300, the line drivers 16 amplify the output signals from the flip-flops in the data section 300–D and apply the signals to the computer system 20. The computer system 20 stores the inquiry character and gets ready to receive the next character of the inquiry message.

The operation of the systems shown in FIG. 11 during the write cycle is of considerable importance. A control signal is formed at the M=05 output circuit of the M signal generator 621, therefore, the gates 710–0 through 710–11 are activated and couple the primed output circuits of the information register 300 to the OR gates 702–0 through 702–11. Thus, when the timing generator 649 forms its write control signal, the gates 710–0 through 710–5 cause the character read out of the memory cells #6 through #11 and stored in the buffer section 300–B to be written back into memory cells #0 through #5 of the same memory location. Similarly, the gates 710–6 through 710–11 cause the character read out of the memory cells #0 through #5 and stored in the data section 300–D to be written into memory cells #6 through #11. In this manner the positions of the two characters stored in the memory location are reversed so that when the next memory access takes place the second character will be stored in the data section 300–D of the information register 300 for transmission via the line drivers 16 to the computer system 20.

When the computer system 20 is ready to receive the next character it forms another control signal at the ICTS output circuit. Referring to FIG. 6, it will be noted that the control signal at the ICTS output circuit in combination with the control signal at the M=05 output circuit causes the gates 644 and 622 to energize the clock generator 623 causing it to form a clock pulse. The clock pulse formed by the clock generator 623 causes the gates 302–0 through 302–5 and 303–6 through 303–11 (see FIG. 11) to reset the associated flip-flops into a zero state and causes the X register 404 to count the address contained therein up one. It should be noted that only flip-flops X1FF through X8FF of the X register 404 are used for addressing the magnetic core memory 201. When the X register 404 is counted it causes the X0FF flip-flop to count from one state to the other but only when the X0FF is in a one state and is counted back to a zero state does it cause the rest of the flip-flops of the X register 404 to count. Therefore, the X register 404 must be counted twice before a new memory location of the magnetic core memory 201 is addressed.

This is the first time that the X register 404 has been counted and the initial memory location of the magnetic core memory 201 has only been addressed once, therefore the initial memory location of section 0 is to be addressed again.

To this end the clock pulse formed by the clock generator 623 which reset the flip-flops of the information register 300 to state zero and counted the X register 404 also causes the timing generator 649 to sequence through its cycle of operation again and cause another read and write operation. This causes the second character in the memory location to be read out and stored in the data section 300–D of the information register 300. During the write operation the characters contained in the flip-flops of the information register 300 are written back into the magnetic core memory into the same parts of the addressed memory location from which the characters were originally read.

When the computer system 20 forms a control signal at the ICTS output circuit again the clock generator 623 again forms a clock pulse causing the X register 404 to count from one state to the next. This time the states of the flip-flops X1FF through X8FF are affected causing the next memory location in section 0, designated by the Y register 402, to be addressed. During the subsequent two memory cycles the content of the next addressed memory location is read out and the characters one after the other stored in the data section 300–D and transferred through the line drivers 16 to the computer system 20.

This read and write operation is repeated for each memory memory location of section 0 of the magnetic core memory 201 until a group mark signal is encountered designating that that is the end of the inquiry message. When the group mark character is encountered the decoder circuit 628 applies a control signal at the D=GM output circuit (see FIG. 6). This signal causes the gates 646 and 639 to set both the M signal generator 621 and the P signal generator 620 into state four.

With the M and P signal generators in state four, the signal generator **621*c* causes the X address register 404 to be loaded again with the initial address, in a conventional manner well known in the computer art. The initial address of the section 0 of the magnetic core memory 201** is the one into which the first reply character will be stored.

COMPUTER SYSTEM TO MEMORY MEANS PARALLEL BY BIT INPUT MODE

Refer again to FIG. 11 and consider the circuitry required for carrying out the computer system to memory means parallel by bit input mode of operation. The circuitry shown in FIG. 11 for operation during this mode of operation is similar to that used during the memory means to computer system parallel by bit output mode of operation.

The only material difference between the circuitry is in the gating for the flip-flops of the information register 300. During the computer system to memory means parallel by bit input mode of operation control signals are applied at the M=05 and P=04 output circuit causing the gate 658 and the inverter circuit 660 to remove the control signal at the MCWS' output circuit (see FIG. 9). With the control signal removed at the MCWS' output circuit, the gate 312 in each of the gating circuits 302–0 through 302–5 are disabled and inhibit the gates 302–0 through 302–5 from storing the signals amplified by the sense amplifiers 204–0 through 204–5 into the data section 300–D of the information register 300. Instead of storing the signals amplified by the sense amplifiers, the flip-flops of the data section 300–D of the information register 300 are arranged for storing the reply characters formed at the output circuits, T0, T0', T1, T1' . . . T5, T5′ from the computer system 20. To this end, the OR gates 304 and 306 of the gating circuits 302–0 through 302–5 are connected to output circuits of a gating circuit 320.

The gating circuit 320 is composed of conventional AND gates which couple the input circuits thereof to the correspondingly numbered output circuits in response to a control signal at a D◁—T input circuit thereof. The signals applied at the D◁—T input circuit of the gate 320 cause the signal at the input circuit to be applied as a trigger pulse to the correspondingly numbered output circuit for causing the flip-flops in the data section 300–D to be triggered into the corresponding state of operation. For example, when a control pulse is applied at the D◁—T input circuit of the gate 320, the signal at the T0 input circuit is applied as a strobe pulse to the *t*0 output circuit. A small letter *t* is used to distinguish the output circuits from the input circuits.

The OR gates 304 and 306 of the gate 302–0 are connected to the T0 and T0′ output circuits of the gate 320. The OR gates 304 and 306 of the gating circuits 302–1 through 302–5 are similarly connected to the correspondingly numbered output circuits of the gating circuit 320.

The control unit 600 has an OR gate 666, an AND gate 666 and an AND gate 667 for forming the control signals at the D◁—T input circuit of the gating circuit 320. The gate 667 has input circuits connected to the output circuits CCP, M=05 and P=04. The gate 666 has the input circuits connected to the output circuits CCP, M=04 and P=04.

With reference to the flow diagram of FIG. 13, it will be noted that the buffer section 300–B of the information register 300 must be reset to zero. To this end, an AND gate 669 is provided in the control unit 600 for applying a control signal at the B◁—0 output circuit which is connected to the OR gate 310 of each of the gates 303–6 through 303–11.

Consider now the operation of the inquiry system during the computer system to memory means parallel by bit input mode of operation.

Initially the signal generator **621*b* causes the address of the initial memory location to be loaded into the X register 404 in the manner noted hereinabove. The Y register 402 is still storing signals designating the section 0 from which the inquiry message was read out of the magnetic core memory 201 for the computer system 20. Therefore, after the X register 404 is loaded and the computer system 20 is ready to provide the first character of a reply message, a control signal is formed at the ICTS output circuit of the computer system 20. This causes the signal generator 621 to apply a control signal at the C output circuit thereof causing control signals to be applied to the M◁—05 input circuit of the M signal generator 621 and to the gating circuit 622 (see FIG. 6). The gate 622 in turn causes the clock generator 623** to form a clock pulse.

Also, the computer system 20 forms a reply character for storage in the data section 300–D. The gates 668 and 666 apply a control signal to the D◁—T input of the gate 320 during the clock pulse causing the gate 320 to store the reply character into the data section 300–D via the gating circuits 302–0 through 302–5. The clock pulse also causes the timing generator 649 to form memory control signals causing a read and write operation to take place.

During the read operation the content of the initial memory location of section 0 of the magnetic core memory 201 is addressed and read out and stored in the information register 300. However, it should be noted that only the gates 303–6 through 303–11 store only the former content of the memory cells #6 through #11 in the buffer section 300–B. To this end, the control signals at the M=05 and the P=04 output circuits cause the gate 658 and inverter circuit 660 (see FIG. 6) to remove the control signal from the MCWS′ output circuit thereby preventing the gates 312 in each of the gating circuits 302–0 through 302–5 from storing signals into the data section 300–D which now contains the reply character.

During the subsequent write cycle, the content of the data section 300–D is written into memory cells #6 through #11 and the content of the buffer section 300–B is written into memory cells #0 through #5 of the initial memory location of section 0.

When the computer system 20 has another reply character for storage in the magnetic core member it forms another control signal at the ICTS output circuit. With reference to FIG. 6 is will be seen that the control signal at the ICTS and M=05 output circuits cause the gates 644 and 622 to energize the clock generator 623 and cause another clock pulse to be formed. The clock pulse causes the gate 669 (see FIG. 11) to apply another control signal at the B◁—0 output circuit which causes the gates 310 in each of the gating circuits 303–6 through 303–11 to reset the flip-flops in the buffer section 300–B into zero states. The clock pulse also causes the gate 667 to apply a strobe signal to the gate 320 causing it to store the next reply character into the data section 300–D. The very same clock pulse causes the address in the X register 404 to be counted up one and the timing generator 649 to go through another timing cycle and read out the content of the addressed memory location and apply the signals to the sense amplifiers 204. The subsequent strobe signal causes the character of signals read out of the memory cells #0 through #5 to be stored in the buffer section 300–B of the information register 300.

At this point the data section 300–D contains the new reply character and the buffer section 300–B contains the preceding reply character formerly stored in the magnetic core memory 201. The subsequent write signal causes the two characters stored in the data section 300–D and buffer section 300–B to be written into memory cells #6 through #11 and #0 through #5, respectively, of the same memory location of the magnetic core memory 201.

The next clock pulse causes the X address register 404 to count the address contained therein for the second time and thereby address the next sequential column in the memory 201. Thus, the next two characters sent by the computer system 20 will be stored in the next memory location of section 0, of the magnetic core memory 201.

This operaton is repeated for each character of the reply message sent by the computer system 20 until a group mark signal is stored in the data section 300–D signalling that the end of the reply message has arrived. The next clock pulse following the storage of the group mark signal causes the gates 636 and 635 to set the M signal generator 621 into state fifteen and set the P signal generator 620 into state zero, thereby terminating the computer system 20 to memory means parallel by bit input mode of operation. During state fifteen the signal generator **621*d*** sets up the necessary conditions for a memory means to typewriter station serial by bit output mode of operation described in connection with FIG. 10.

It should be noted that "word" as used in the following claims is meant to refer to a group of bits which may represent one or more characters of information, a complete word of information or just an assemblage of bits which are to be stored.

What is claimed is:

1. In a storage system for arranging and accumulating a series of digital bits comprising: memory means having a plurality of addressable memory locations, the memory means comprising 1 through *n* memory cells for each memory location and arranged for reading out and writing the content of an addressed memory location in parallel; means for receiving an input signal comprising a series of *n* digital bits and causing same to be written bit by bit in memory cell 1 of an addressed memory location; means for repeatedly addressing a memory location for repeatedly causing the reading and writing therein; temporary information storage means; and means coupled between the memory means and the information storage means for transferring the signal content of memory cells 1 through $n-1$ which is read out of the addressed location to be the temporary storage means and back, the coupling means having for the flow of signals parallel input and parallel output paths from the memory means to the temporary storage means which are displaced with respect to each other causing the signal content read out of an addressed memory location to be rewritten in the same memory location displaced a prefixed number of memory cells from which the same is read and thereby accumulate the input signals in the addressed memory location.

2. In a storage system for receiving and accumulating a series of digital bits comprising: memory means having a plurality of addressable memory locations, the memory means comprising 1 through $n$ memory cells for each memory location and arranged for reading out and writing the signal content of an addressed memory location in parallel; means for receiving a series of $n$ digital bits and causing same to be stored bit by bit in memory cell 1 of an addressed memory location; and means for repeatedly addressing a memory location for repeatedly causing reading and writing therein; temporary information storage means; and means coupled between the memory means and the information storage means for transferring the signal content of memory cells 1 through $n-1$ of the addressed location to the temporary storage means and back, the coupling means having for the flow of signals parallel input and parallel output paths from the memory means to the temporary storage means which are displaced one memory cell with respect to each other causing the signal content read out of an addressed memory location to be rewritten in memory cells 2 through $n$ of the same memory location from which the same is read and thereby accumulate the input signals in the addressed memory location.

3. In a storage system for arranging and accumulating a series of digital bits comprising: memory means having a plurality of addressable memory locations, the memory means comprising 1 through $n$ memory cells for each memory location and arranged for reading out and writing the signal content of an addressed memory location in parallel and including an input circuit for receiving a digital signal comprising a series of $n$ bits for storage in an addressed memory location; and means for addressing a memory location at least once for each received bit causing reading and writing in the addressed memory locations including the writing of the received bits, one by one, in cell 1 of the addressed memory location; temporary information storage means; and means coupled between the memory means and the information storage means for transferring the signal content of memory cells 1 through $n-1$ which is read out of the addressed location to the temporary storage means and back, the coupling means having for the flow of signals parallel input and parallel output paths from the memory means to the temporary storage means which are displaced with respect to each other causing the signal content read out of an addressed memory location to be rewritten in the same memory location displaced a prefixed number of memory cells from which the same is read and thereby accumulate the input signals in the addressed memory location.

4. In a storage system for arranging and accumulating a series of digital bits comprising: memory means having a plurality of addressable memory locations, the memory means comprising 1 through $n$ memory cells for each memory location and arranged for reading out and writing the signal content of an addressed memory location in parallel; means for receiving an input signal comprising a series of $n$ digital bits and for causing same to be written bit by bit in memory cell 1 of an addressed memory location; means for addressing a memory location of the memory means; means for detecting a received bit; timing means for causing the content of the addressed memory location to be read out upon detection of a received bit and subsequently causing signals to be written therein; temporary information storage means; and means coupled between the memory means and the information storage means for transferring the signal content of memory cells 1 through $n-1$ of the addressed location to the temporary storage means and back, the coupling means having for the flow of signals parallel input and parallel output paths from the memory means to the temporary storage means which are displaced with respect to each other causing the signal content read out of an addressed memory location to be rewritten in the same memory location displaced a prefixed number of memory cells from which the same is read and thereby accumulate the input signals in the addressed memory location.

5. A storage system for receiving and accumulating a series of digital bits comprising: a magnetic core memory unit including addressable memory locations therein each having 1 through $n$ core memory cells; 1 through $n$ write drivers coupled to memory cells 1 through $n$, respectively, of all memory locations, each write driver being responsive to an applied input signal for causing a signal to be stored in the corresponding memory cell of an addressed memory location indicative of the input signal; an information storage register having storage cells 1 through $n-1$; sense amplifiers for memory cells 1 through $n-1$ coupled to the information storage register for causing storage in storage cells 1 through $n-1$, respectively, of signals which are read out of the corresponding memory cells in an addressed memory location; means for coupling storage cells 1 through $n-1$ to the writer drivers 2 through $n$, respectively; means for receiving and applying a series of $n$ digital signal bits to said write driver 1 for causing the bits to be stored in memory cell 1 of an addressed memory location one bit at a time as received; and means for repeatedly addressing a memory location into which such received signal bits are to be stored, for repeatedly causing the content thereof to be read out and stored in said register by said sense amplifiers and subsequently rewritten into the addressed memory location by said write drivers, the coupling means causing the received bits which are stored in the addressed memory location to be shifted by one cell each time they are read out of and rewritten into the addressed memory location thereby accumulating the received bits therein.

6. A storage system as defined in claim 5 including timing means for causing the addressing means to address the memory location of said memory unit upon receiving each bit and including means for causing the content of said register to be stored simultaneously with each bit.

7. A storage system as defined in claim 5 wherein said receiving means comprises a bistable circuit and wherein the simultaneous storing means is adapted to store the content of the information register and said bistable circuit.

8. A storage system as defined in claim 6 wherein said means for receiving an input word has a plurality of input circuits for receiving signal bits from separate asynchronous sources, a separate memory location in said memory unit being assigned for each input circuit of said receiving means, said receiving means including gating means and counting means for causing the gating means to scan the input circuits and interleave the application from the bits of the various sources to the write driver 1, said addressing means including means for causing a memory location which corresponds to an input circuit to be addressed upon the application of a bit from such input circuit to the write driver 1.

9. In a system for accumulating serial and digital words in a parallel storage device comprising: memory means having a plurality of addressable memory locations, the memory means comprising 1 through $n$ memory cells for each memory location and 1 through $n$ input and output circuits; storage means coupled to output circuit 1 through $n-1$ causing the content of memory cells 1 through $n-1$ of an addressed memory location to be stored in said storage means, the storage means also being coupled to input circuits 2 through $n$ of the memory means causing the storage content thereof from cells 1 through $n-1$ to be restored into memory cells 2 through $n$ of an addressed memory location; and means for receiving an input word comprising a series of $n$ digital bits and for applying a signal indicative thereof to input circuit 1, said memory means including means for addressing a memory location upon the receipt of each bit of the input word causing the content of the addressed memory location to be read out and stored in the storage means and subsequently rewritten along with the received bit, the rewritten information thereby being displaced in the memory cells of the addressed memory location from which they were read so that a complete input word can be accumulated in the addressed memory location.

10. In a system for accumulating digital words arranged serial by bit in a parallel storage device comprising: a memory means having a plurality of addressable memory locations, the memory means comprising 1 through $n$ magnetic core memory cells for each memory location and coupled thereto 1 through $n$ sense amplifiers and write drivers for memory cells 1 through $n$; storage means, the sense amplifiers 1 through $n-1$ being coupled to the storage means for causing the content of memory cells 1 through $n-1$ of an addressed memory location to be stored in said storage means, the storage means also being coupled to write drivers 2 through $n$ for causing the storage content thereof from cells 1 through $n-1$ to be restored into memory cells 2 through $n$ of an addressed memory location; and means for receiving an input word comprising in series of $n$ digital bits and for applying a signal indicative thereof to write driver 1, said memory means including means for addressing a memory location upon the receipt of each bit of the input word causing the content of the addressed memory location to be read out and stored in the storage means and subsequently rewritten along with the received bit, the rewritten information thereby being displaced in the memory cells of the addressed memory location from which they are read so that a complete input word can be accumulated in the addressed memory location.

11. In a system for accumulating a digital signal having a series of $n$ bits of information comprising: a plurality of magnetic cores arranged in 1 through $n$ rows and a plurality of columns; current carrying conductors threading through said cores comprising a read conductor and a write conductor for each row threading through the cores in the corresponding row; a write current driver for each row of cores having an input circuit and an output circuit which is coupled to the write conductor for applying a write control signal thereto indicative of an input signal; a register comprising storage cells 1 through $n-1$, each of said cells comprising input and output circuits; 1 through $n-1$ sense amplifiers having input circuits coupled to the read conductors coupled to rows 1 through $n-1$, respectively, and output circuits coupled to the input circuits of register cells 1 through $n-1$, respectively, causing signals to be stored in the corresponding storage cells in response to signals applied to the corresponding sense conductors; means for addressing the content of each of said columns including means cooperating with the write drivers for causing signals to be stored into the cores of the addressed column and including means for causing the storage content of the cores of an addressed column to be read out and applied to the corresponding sense conductors; means for receiving a digital input signal comprising a series of $n$ bits of information and for applying a signal to the input circuit for the write driver, corresponding to row 1, causing a write signal on the corresponding write conductor indicative of each bit of such input signal; and a gating circuit coupling the output circuit of register storage cells 1 through $n-1$ to the input circuits of the write drivers corresponding to rows 2 through $n$, respectively, the addressing means causing reading and writing in a column of cores to be repeated plurality of times and thereby cause bits of the signal being stored to be sequentially shifted through the cores of the addressed column as the content thereof is read out and rewritten for accumulating the bits of the input signal in the addressed memory location.

12. A storage system as defined in claim 9 including means for detecting a received signal bit and timing means for causing the addressing means to address columns of magnetic cores upon the detection of a received signal bit and causing the content of said register to be stored simultaneously with a received signal bit.

13. A storage system as defined in claim 10 wherein said means for receiving an input signal to be stored has a plurality of input circuits for receiving input signals from separate asynchronous sources, said receiving means including gating means and counting means for causing the gating means to scan the input circuits and interleave the application of the bits of the various input words to the write driver corresponding to row 1, a separate column of cores being assigned for each input circuit of said receiving means, said addressing means including means for causing a column of cores which correspond to an input circuit to be addressed upon the application of a bit from such input circuit to the write driver.

14. In a storage system comprising: memory means having a plurality of addressable memory locations and arranged for reading out and writing the signal content of an addressed memory location in parallel, the memory means comprising 1 through $n$ memory cells for each memory location; temporary information storage means coupled to the memory means; means for repeatedly addressing a memory location and for repeatedly causing the content of memory cells 1 through $n-1$ of the addressed location to be read out and stored in the temporary storage means and subsequently rewritten into the addressed memory location; and first and second parallel coupling means coupled between the output circuit and input circuit, respectively, of the memory means and the storage means, the coupling of said first and second means being displaced with respect to each other causing the bits which are read out of the memory means into the storage means and then rewritten to be shifted from cells 2 through $n$ to cells 1 through $n-1$ thereby providing a signal path causing the bits of the word stored in the addressed memory location to be sequentially stored in memory cell $n$ and thereby translated into a series of signal bits.

15. In a storage system for translating signals between serial by bit and parallel by bit comprising: memory means having a plurality of addressable memory locations, the memory means comprising a plurality of memory cells for each memory location; temporary information storage means coupled to the memory means; means for repeatedly addressing a memory location and for repeatedly causing signals contained in memory cells thereof to be read out and stored in the temporary storage means and subsequently rewritten into memory cells of the addressed memory location including a predetermined memory cell, and first and second means coupled between the output circuit and the input circuit, respectively, of the memory means and the storage means, the coupling of said first and second coupling means to the memory cells being displaced with respect to each other causing the bits in the addressed memory location to be shifted from one memory cell to another when a read out and rewrite operation takes place thereby making the bits of the addressed memory location available one by one at one memory cell.

16. In a storage system comprising: memory means having a plurality of addressable memory locations, each comprising a plurality of memory cells for storing a plurality of signal bits; temporary information storage means coupled to said memory means; means coupled between the information storage means and the memory means providing a path causing the signals read out of an addressed memory location of the memory means to be written back into such addressed memory location shifted in the memory cells from which the signals were read; and means for addressing a memory location causing the content of the memory cells thereof to be read out, stored in the temporary storage means and rewritten into an addressed memory location, the coupling means thereby causing a shift in the position of the signal bits contained in an addressed memory location during each read and rewrite cycle of operation.

17. In a storage system comprising: memory means having input and output circuits and having a plurality of addressable memory locations, each comprising a plurality of memory cells for storing a plurality of signal bits; temporary information storage means having an input circuit coupled to the output circuit of said memory means and an output circuit; a controllable gating circuit coupled between the input circuit of the memory means and the output circuit of the information storage means; control circuit means adapted for applying control signals to said controllable gating circuit causing same to couple signal bits read out of the memory means and stored into the information storage means back into the memory means shifted by a predetermined amount in the memory cells of the memory location from which the same are read; and means for addressing a memory location causing the content of the memory cells thereof to be read out, stored in the information storage means and rewritten into an addressed memory location the gating circuit causing a shift in the position of the signal bits in the cells of an addressed memory location during a read and rewrite operation.

18. In a storage system arranged for shifting the content of a memory location, the combination comprising: memory means having a plurality of addressable memory locations, each having at least two sections for storing two signals; temporary information storage means having at least two sections for temporarily storaging signals being shifted in the memory means; means for addressing a memory location in the memory means at least twice for transferring signals between the addressed memory location and the information storage means; and means for coupling signals between the information storage means and the memory means, said coupling means being adapted to cross couple signals transferred between the information storage means and the memory means such that a signal stored in a first section of the addressed memory location is subsequently written in the second section of the addressed memory location.

19. In a storage system as defined in claim 18 including second means coupled to the first section of an information storage means for transferring signals between the information storage means and another device.

20. In a storage system as defined in claim 19 wherein said second coupling means includes a gate adapted for receiving two successive words comprising a plurality of bits, for storage in an addressed memory location of the memory means and for storing each word into the first section of said information storage means parallel by bit.

21. In a storage system as defined in claim 19 wherein said coupling means comprises a gate for coupling signals from the first section of said information storage means to another device parallel by bit.

22. In a storage system arranged for shifting the contents of a memory location, the combination comprising: memory means having a plurality of addressable memory locations, each having at least two sections for storing signals; temporary information storage means having at least two sections for temporarily storing signals being shifted in the memory means; means for addressing a memory location in the memory means; timing means adapted for serially causing the memory means to read out the content of an addressed memory location for storage in the information storage means and the memory means to rewrite the contents of the storage means into the addressed memory location; and means for cross coupling the sections of the storage means and memory means causing a signal stored in a first section of the memory means to be subsequently rewritten in the second section of the addressed memory location.

23. In a storage system arranged for shifting the contents of a memory location, the combination comprising: a magnetic core memory means having a plurality of addressable memory locations, each having at least two sections for storing signals; temporary information storage means having at least two sections for temporarily storing signals being shifted in the memory means; means for addressing a memory location in the memory means; timing means for causing the memory means to serially read out the content of an addressed memory location for storage in the information storage means and the memory means to rewrite the contents of the storage means into the addressed memory location; and a gating circuit adapted for cross coupling words transferred between the information storage means and the memory means such that a word stored in a first section of the memory means is subsequently written in the second section of the addressed memory location.

24. In a storage system comprising: memory means having a plurality of addressable memory locations, the memory means comprising first and second memory sections for each memory location for storing two words of information; temporary information storage means comprising first and second storage sections; gating means coupled to the first section of said information from another device storage means for receiving two words of information and for storing the words, one at a time, into the first section of the information storage means; means for storing the content of the second section of an addressed memory location into the second section of the information storage means; means coupled between the information storage means and the memory means for causing the content of the first and second sections of the information storage means to be written into the second and first sections, respectively, of an addressed memory location; and means for addressing and repetitively accessing a memory location causing a first one of the two successively received words to be written from the information storage means into the second section of the addressed memory location and subsequently causing such first word to be read out into the information storage means and then rewritten into the addressed memory location along with the second one of the two successively received words, the coupling means causing the first and second words to be written into the first and second sections, respectively, of the addressed memory location.

25. In a storage system as defined in claim 24, wherein said memory means comprises a plurality of magnetic cores arranged in 1 through $2n$ rows and columns, one column for each memory location, conductors threading through said cores including a sense conductor for each row in the second section and a write conductor for each row in both the first and second sections, the sense and write conductors being threaded through the cores in the corresponding rows, a sense amplifier for each sense conductor and connected to the storing means, the sense amplifiers being adapted for providing a signal to the information storage means for storage which corresponds to a signal on the corresponding sense conductor, and a current driver for each write conductor connected to the coupling means, the current drivers being adapted for providing a write current for the corresponding write conductors representative of the storage content of the information storage means, the coupling means being arranged for coupling the first section of the information storage means to the current drivers corresponding to rows $n+1$ through $2n$ and for coupling the second section of the information storage means to the current drivers corresponding to rows 1 through $n$.

26. In a storage system comprising: magnetic core memory means having a plurality of a addressable memory locations, each memory location comprising a first memory section having 1 through $n$ memory cells and a second memory section having $n+1$ through $2n$ memory cells, for storing two words of information, the memory means $n+1$ through $2n$ output circuits at which signals corresponding to the second section of an addressed memory location are applied and comprising 1 through $2n$ input circuits at which signals for an addressed memory location are applied for storage, temporary information storage means comprising a first storage section having 1 through $n$ storage cells, and a second storage section having $n+1$ through $2n$ storage cells; gating means coupled to the input circuits of the first section of said information storage means for receiving a series of words of information and for storing the words into the first section of the information storage means; means coupled between said output circuit of said memory means and the input circuit of the second section of said information storage means for storing the content of the second section of an addressed memory location in the second section of the information storage means; means coupled between the first section of the information storage means and input circuits $n+1$ through $2n$ of the memory means and means coupled between the second section of the information storage means and input circuits 1 through $n$ of the memory means for causing the content of the first and second sections of the information storage means to be written into the second and first sections, respectively, of an addressed memory location; and means for addressing and repetitively accessing each of a series of memory locations and thereby cause a first one of two successively received words to be written from the information storage means into the second section of the addressed memory location and subsequently causing such first word to be read out into the information storage means and then rewritten into the addressed memory location along with the second one of the two successively received words, the coupling means causing the first and second words to be written into the first and second sections, respectively, of the addressed memory location.

27. In a storage system comprising: memory means having a plurality of addressable memory locations, the memory means comprising first and second memory sections for each memory location for storing two words of information; temporary information storage means comprising first and second storage sections; gating means coupled to the first section of said information storage means for receiving a series of words of information and for storing the words into the first section of the information storage means; means for storing the content of the second section of an addressed memory location into the second section of the information storage means; means coupled between the information storage means and the memory means for causing the content of the first and second sections of the information storage means to be written into the second and first sections, respectively, of an addressed memory location; and means for addressing and repetitively accessing a desired memory location at least twice and thereby cause a first one of two successively received words to be written into the second section and subsequently read out into the information storing means and rewritten into the first section of the addressed memory location and for causing the second one of two successively received words to be written into the second section of the addressed memory location.

28. In a storage system comprising: memory means having a plurality of addressable memory locations, the memory means comprising first and second memory sections for each memory location for storing two words of information; temporary information storage means comprising first and second storage sections for storing two words of information; means for storing the content of the first and second sections of an addressed memory location into the first and second sections, respectively, of the information storage means; means coupled between the information storage means and the memory means for causing the content of the second section of the information storage means to be written into the first section of an addressed memory location; and means for addressing and repetitively accessing a desired memory location twice and thereby cause two words contained in the first and second sections thereof to be read out and stored into the first and second sections, respectively, of said information storage means and for causing the word stored into the second section of the information storage means to be written back into the first section of the addressed memory location and subsequently read out and stored into the first section of the information storage means and thereby cause the two words in the addressed memory locations to be successively stored in the same section of the information storage means for output.

29. In a storage system as defined in claim 28 wherein said memory means comprises: a plurality of magnetic cores for each memory section, each memory section being arranged in 1 through $n$ rows and in columns, one column for each memory location, current carrying conductors threading through said cores including a sense conductor for each individual row in the first and second sections of all memory locations and a write conductor for each individual row in said second section the sense and write conductors being threaded through the cores in the corresponding rows, a sense amplifier for each sense conductor and connected for providing a signal to the information storage means for storage which corresponds to the content of the core of an addressed memory location, and a current driver for each write conductor adapted and connected to the coupling means for providing a write current signal for the corresponding write conductor representative of the storage content of the second section of the information storage means, the coupling means being arranged for coupling the second section of the information storage means to the current drivers for the first section of the memory locations of the memory means.

30. In a storage system comprising: memory means having a plurality of addressable memory locations, the memory means comprising first and second memory sections for each memory location for storing two words of information; temporary information storage means comprising first and second storage sections for storing two words of information; means for storing the content of the first and second sections of an addressed memory location into the first and second sections, respectively, of the information storage means; means coupled between the information storage means and the memory means for causing the content of the second section of the information storage means to be written into the first section of an addressed memory location; and means for addressing a memory location in the memory means; timing means adapted to cause the memory means to read out the two characters contained in the first and second sections of the addressed memory location for storage in the first and second sections of the information storage means and for causing the character stored in the second section of the information storage means to be written into the first section of the addressed memory location, the timing means additionally being adapted for causing the memory means to read out of the contents of the addressed memory location a second time and thereby cause the two words in the addressed memory location to be successively stored in the same section of the information storage means for output.

31. In a system for storing a digital input signal characterized as serial by bit and also for storing a digital input signal characterized as parallel by bit comprising: memory means having input and output circuits and having a plurality of addressable memory locations, each memory location comprising a plurality of memory cells for storing a plurality of signal bits; temporary information storage means having an input circuit coupled to the output circuit of said memory means and an output circuit; a controllable gating circuit coupled between the input circuit of the memory means and the output circuit of the information storage means; means for receiving and applying a serial by bit input signal to the memory means for storage, a bit at a time; means for storing a parallel by bit input signal into said information storage means, said controllable gating circuit having a first coupling condition providing a first signal path to the memory means causing bits read out of the memory means and stored in the information storage means to be rewritten back into the memory means shifted in position a predetermined amount within the memory cells of an addressed memory location from which the same are read and having a second coupling condition providing a second signal path to the memory means; control circuit means for providing a first control signal to the gating circuit causing such first signal path to be established for the storage of a bit of a serial by bit signal and providing a second control signal causing such second signal path to be established for the storage of a parallel by bit signal contained in the information storage means; means for addressing a memory location; and timing means for causing the memory means to write the bits of a parallel by bit input signal which are stored in the information storage means through said second signal path of the gating means into the addressed memory location, the timing means additionally causing the memory means to write the bits of a serial by bit input signal into a predetermined cell of the addressed memory location while simultaneously causing the content of an addressed memory location which is read out and stored in the information storage means to be rewritten into the addressed memory location through said first signal path of the gating means and thereby cause the bits of the serial input signal to be shifted and accumulated in the cells of the addressed memory location.

32. In a memory system including a magnetic core memory, an information register coupled thereto for storing information read out of and written into said core memory, each memory location in said core memory having 1 through $n$ corresponding core positions in which information is read and written in parallel, and including timing means which, when initiated, causes a read out of an addressed memory location into the information register followed by a write from the information register into the core memory wherein the improvement comprises means coupled between the information register and the core memory for shifting information by at least one core position as it is transferred between the core memory and the information register and thereby effect a shift of the information among the 1 through $n$ cores during a read and write cycle.

33. In a memory as defined in claim 32 wherein said core memory has 1 through $n$ output circuits and 1 through $n$ input circuits and said information register has 1 through $n$ storage cells corresponding to the 1 through $n$ input and output circuits, said coupling means including means for coupling each cell of the information register to both an input and an output circuit of the core memory, said coupling means coupling each cell of the information register to a differently numbered input circuit of the core memory from the output circuit of the core memory that is coupled thereto thereby effecting said shift in information during a read and write cycle of operation.

References Cited

UNITED STATES PATENTS

| | | | |
|---|---|---|---|
| 3,054,988 | 9/1962 | Edwards et al. | 340—172.5 |
| 3,311,891 | 3/1967 | Brady et al. | 340—172.5 |

ROBERT C. BAILEY, *Primary Examiner.*

G. D. SHAW, *Assistant Examiner.*

UNITED STATES PATENT OFFICE
CERTIFICATE OF CORRECTION

Patent No. 3,356,993 December 5, 1967

Richard S. Sharp

It is hereby certified that error appears in the above numbered patent requiring correction and that the said Letters Patent should read as corrected below.

Column 3, line 21, for "chematic" read -- schematic --; column 9, line 65, for "operaaion" read -- operation --; column 11, line 29, for "reigster" read -- register --; column 14, line 40, for "understaning" read -- understanding --; column 21, line 34, for "theo utput" read -- the output --; line 38, for "circuit" read -- circuits --; column 25, line 68, for "104-11" read -- 704-11 --; column 29, line 29, for "M 00" read -- M◁-00 --; column 34, line 34, strike out "memory", second occurrence; column 35, line 75, for "MCWS'" read -- MCWS --; column 36, line 13, for "is" read -- it --; column 37, line 7, strike out "be"; column 38, line 37, for "writer" read -- write --; line 70, for "from" read -- of --; same line 70, for "of" read -- from --; column 40, line 49, before "causing" insert -- providing a signal path --; line 52, strike out "providing a signal path"; column 41, line 11, for "written" read -- rewritten --; column 42, line 26, strike out "adapted"; lines 38 and 39, strike out "from an-other device"; line 40, after "information" insert -- from another device --; column 43, line 8, strike out "a", second occurrence; line 13, after "means" insert -- comprising --.

Signed and sealed this 17th day of June 1969.

(SEAL)
Attest:

EDWARD M.FLETCHER,JR.
Attesting Officer

WILLIAM E. SCHUYLER, JR.
Commissioner of Patents